US009738039B2

(12) United States Patent
Stephens et al.

(10) Patent No.: US 9,738,039 B2
(45) Date of Patent: Aug. 22, 2017

(54) APPARATUS FOR CO-CURING COMPOSITE SKINS AND STIFFENERS IN AN AUTOCLAVE

(71) Applicant: The Boeing Company, Chicago, IL (US)

(72) Inventors: Jeffrey Scott Stephens, Renton, WA (US); Steven Douglas Bye, Renton, WA (US); Dan Day, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/150,425

(22) Filed: May 9, 2016

(65) Prior Publication Data

US 2016/0250813 A1 Sep. 1, 2016

Related U.S. Application Data

(62) Division of application No. 13/644,587, filed on Oct. 4, 2012, now Pat. No. 9,333,713.

(51) Int. Cl.
*B29C 65/00* (2006.01)
*B29C 35/00* (2006.01)
*B29C 70/44* (2006.01)
*B29C 33/50* (2006.01)
*B29D 99/00* (2010.01)
B29K 105/06 (2006.01)
B29L 31/30 (2006.01)

(52) U.S. Cl.
CPC .......... *B29C 70/446* (2013.01); *B29C 33/505* (2013.01); *B29D 99/0014* (2013.01); B29K 2105/06 (2013.01); *B29L 2031/3076* (2013.01); Y02T 50/433 (2013.01)

(58) Field of Classification Search
CPC ......... B29C 65/00; B29C 65/02; B29C 35/00; B29C 35/02; B29C 35/0227; B29C 66/00; B29C 66/001; B29C 66/00145
See application file for complete search history.

(56) References Cited

U.S. PATENT DOCUMENTS 2,485,898 A   10/1949  Mathews et al.
3,306,767 A    2/1967  Snyder
(Continued)

FOREIGN PATENT DOCUMENTS

DE    WO 2008003733 A1 *  1/2008  ........... B29C 33/505
DE    102010024120 A1    12/2011
(Continued)

OTHER PUBLICATIONS

PCT Search Report and Written Opinion, dated Dec. 19, 2013, regarding Application No. PCT/US2013/057089, 11 pages.
(Continued)

*Primary Examiner* — Michael N Orlando
*Assistant Examiner* — Matthew Hoover
(74) *Attorney, Agent, or Firm* — Yee & Associates, P.C.

(57) ABSTRACT

A composite skin and composite stiffeners are co-cured in an autoclave. Uncured stiffeners are placed in channels of a tool, and an uncured skin is placed on the tool contacting the stiffeners. The vacuum bag is sealed over the tool. Bladders placed in the stiffeners are exposed to autoclave pressure through a manifold system employing vent tubes that pass through the vacuum bag along a side of the tool.

14 Claims, 21 Drawing Sheets

(56) References Cited

U.S. PATENT DOCUMENTS

| | | | |
|---|---|---|---|
| 3,610,563 A | 10/1971 | Allen | |
| 3,700,512 A | 10/1972 | Pearson et al. | |
| 3,764,641 A | 10/1973 | Ash | |
| 3,768,769 A | 10/1973 | Sachs | |
| 3,795,559 A | 3/1974 | Horn et al. | |
| 4,087,502 A | 5/1978 | Hoffmeister | |
| 4,662,587 A | 5/1987 | Whitener | |
| 4,675,061 A | 6/1987 | Mead | |
| 4,681,724 A | 7/1987 | Faiz et al. | |
| 4,780,262 A | 10/1988 | VonVolkli | |
| 4,946,526 A | 8/1990 | Petty-Galis et al. | |
| 5,013,514 A | 5/1991 | Azzani et al. | |
| 5,106,568 A | 4/1992 | Honka | |
| 5,259,901 A | 11/1993 | Davis et al. | |
| 5,266,137 A | 11/1993 | Hollingsworth | |
| 5,354,195 A | 10/1994 | Dublinski et al. | |
| 5,366,684 A * | 11/1994 | Corneau, Jr. | B29C 43/3642 156/285 |
| 5,368,807 A | 11/1994 | Lindsay | |
| 5,382,150 A | 1/1995 | Henrio | |
| 5,387,098 A | 2/1995 | Willden | |
| 5,397,524 A | 3/1995 | Phillips | |
| 5,425,628 A | 6/1995 | Pinckney et al. | |
| 5,451,377 A | 9/1995 | Asher et al. | |
| 5,469,686 A | 11/1995 | Pykiet | |
| 5,507,341 A | 4/1996 | Eslinger et al. | |
| 5,538,589 A | 7/1996 | Jensen et al. | |
| 5,605,195 A | 2/1997 | Eslinger et al. | |
| 5,645,668 A | 7/1997 | Lin et al. | |
| 5,707,576 A | 1/1998 | Asher | |
| 5,817,269 A | 10/1998 | Younie et al. | |
| 5,897,818 A | 4/1999 | Lewit et al. | |
| 6,458,309 B1 | 10/2002 | Allen et al. | |
| 6,497,190 B1 | 12/2002 | Lewit | |
| 6,510,961 B1 | 1/2003 | Head et al. | |
| 6,613,258 B1 | 9/2003 | Maison et al. | |
| 6,692,681 B1 | 2/2004 | Lunde | |
| 6,743,504 B1 | 6/2004 | Allen et al. | |
| 6,746,642 B2 | 6/2004 | Buge et al. | |
| 6,749,171 B2 | 6/2004 | Takagi | |
| 7,052,572 B2 | 5/2006 | Miura et al. | |
| 7,074,474 B2 | 7/2006 | Toi et al. | |
| 7,083,698 B2 | 8/2006 | Engwall et al. | |
| 7,138,031 B2 | 11/2006 | Erickson et al. | |
| 7,204,951 B2 | 4/2007 | Simpson et al. | |
| 7,216,832 B2 | 5/2007 | Simpson et al. | |
| 7,293,737 B2 | 11/2007 | Engwall et al. | |
| 7,294,220 B2 | 11/2007 | Anderson | |
| 7,338,703 B2 | 3/2008 | Merriman | |
| 7,357,166 B2 | 4/2008 | Pham et al. | |
| 7,419,130 B2 | 9/2008 | Peery | |
| 7,445,744 B2 | 11/2008 | Simpson et al. | |
| 7,459,048 B2 | 12/2008 | Pham et al. | |
| 7,527,222 B2 | 5/2009 | Biornstad et al. | |
| 7,534,319 B2 | 5/2009 | Mead et al. | |
| 7,790,082 B2 | 9/2010 | Buge et al. | |
| 7,815,160 B2 | 10/2010 | Stenard | |
| 7,824,171 B2 | 11/2010 | Hanson et al. | |
| 7,854,874 B2 | 12/2010 | Martin et al. | |
| 7,861,969 B2 | 1/2011 | Guzman et al. | |
| 7,879,276 B2 | 2/2011 | Guzman et al. | |
| 7,897,225 B2 | 3/2011 | Campbell et al. | |
| 7,972,466 B2 | 7/2011 | Martinez Cerezo et al. | |
| 7,998,299 B2 | 8/2011 | McCarbille et al. | |
| 8,074,694 B2 | 12/2011 | Brook et al. | |
| 2008/0029644 A1 | 2/2008 | Martinez Cerezo et al. | |
| 2008/0131716 A1 | 6/2008 | Ridges | |
| 2008/0277531 A1 | 11/2008 | Ackermann et al. | |
| 2008/0302912 A1 | 12/2008 | Yip et al. | |
| 2009/0261199 A1 | 10/2009 | McCarville et al. | |
| 2010/0006739 A1 | 1/2010 | Robins et al. | |
| 2010/0009124 A1 | 1/2010 | Robins et al. | |
| 2010/0024964 A1 | 2/2010 | Ingram, Jr. et al. | |
| 2010/0129589 A1 | 5/2010 | Senibi et al. | |
| 2010/0139850 A1 | 6/2010 | Morris et al. | |
| 2010/0139857 A1 | 6/2010 | Pham et al. | |
| 2010/0186899 A1 * | 7/2010 | Jackson | B29C 33/10 156/382 |
| 2014/0096903 A1 | 4/2014 | Stephens et al. | |

FOREIGN PATENT DOCUMENTS

| | | |
|---|---|---|
| JP | 06071654 | 3/1994 |
| JP | H07187085 | 7/1995 |
| WO | WO9851481 | 11/1998 |
| WO | WO2005105402 | 11/2005 |
| WO | WO2008003715 | 1/2008 |
| WO | WO2008003721 | 1/2008 |
| WO | WO2008003733 | 1/2008 |
| WO | WO2010005811 | 1/2010 |

OTHER PUBLICATIONS

"Autoclave (industrial)," Wikipedia.org, Apr. 2012, 16 Pages, accessed Oct. 2, 2012 http://en.wikipedia.org/wiki/Autoclave_(industrial).

PCT Search Report dated Feb. 10, 2009 regarding application PCT/US2009/048889, 3 pages.

Webster's New Collegiate Dictionary, G&C Merriam Co., 1977, pp. 1279-1280.

Japanese Notice of Reasons for Rejection, regarding Application No. 2015-0535685, dated Feb. 28, 2017, 6 pages.

* cited by examiner

APPARATUS FOR CO-CURING COMPOSITE SKINS AND STIFFENERS IN AN AUTOCLAVE

This application is a divisional application of U.S. patent application Ser. No. 13/644,587, filed Oct. 4, 2012.

BACKGROUND INFORMATION

1. Field

This disclosure generally relates to manufacturing composite parts, and deals more particularly with a method and apparatus for co-curing composite skins and stiffeners in an autoclave.

2. Background

It is sometimes necessary to cure multiple composite parts in an autoclave which require internal bladders to prevent them from collapsing under autoclave pressure. For example, in the aircraft industry, a composite skin may be compressed against and co-cured with multiple stiffeners having a hat shaped cross-section using a vacuum bag and autoclave pressure. In order to avoid collapsing under the autoclave pressure, the bladders may be vented to the autoclave environment so that the internal pressure in the bladders is substantially that applied by the autoclave. One technique for venting the bladders is to place holes in the bladders which are vented through the vacuum bag. Venting the bladders through the vacuum bag increases the possibility of leakage into the bag, and can also lead to undesirable pre-loading of vent pipes, as well as potential distortion of fiber stiffeners during curing, and possible resin starvation issues.

It would be desirable to provide a method and apparatus for co-curing composite skins and stiffeners which avoid the need for venting the bladders through the vacuum bag while promoting substantially even distribution of autoclave pressure to the bladders. There is also a need for apparatus as described above which may be easily reconfigured for use with differing types of part assemblies.

SUMMARY

The disclosed embodiments provide a method and apparatus for distributing autoclave pressure to an array of a bladders in order to compact fiber reinforced resin stiffeners during an autoclave cure cycle. A manifold system distributes autoclave pressure to the bladders through vent tubes which pass through a reusable vacuum bag at locations outside of area of the bag that overlies the parts being cured. The number of penetrations of the bag for venting purposes is reduced by venting more than one bladder through each vent tube. The manifold system may comprise a plurality of removable manifold boxes arranged end-to-end that may be reconfigured to suit the number of bladders requiring venting. Pre-loading of the vent tubes is avoided, and potential distortion of fibers and/or resin starvation is substantially reduced, or eliminated According to one disclosed embodiment, apparatus is provided for autoclave curing composite stiffeners against a composite skin. The apparatus comprises a tool having a tool surface on which a composite skin may be placed, and at least one channel adapted to have a composite stiffener placed therein beneath the skin; at least one pressurizable bladder adapted to be placed inside the channel for reacting autoclave pressure applied to the stiffener; a vacuum bag adapted to be sealed over the tool for compacting the skin against the stiffener; and a manifold system coupled with the bladder for pressurizing the bladder using autoclave pressure, the manifold system including a vent tube passing through the vacuum bag and exposed to autoclave pressure. The bag may be a reusable bag and is attached to the frame. The bladder includes a vent fitting on one end thereof, and the manifold system is coupled with the vent fitting. The manifold system includes a manifold box, and the vent tube is mounted on the manifold box and coupled with the vent fitting. The manifold box includes a top wall located beneath and in contact with the vacuum bag when the vacuum bag is sealed over the tool, and the vent tube passes through the top wall. The apparatus may further comprise a seal between the vacuum bag and the vent tube. The manifold system and the vent tube are located along a side of the tool, and the vacuum bag is adapted to be sealed to the vent tube.

According to another embodiment, an apparatus is provided for autoclave curing of a plurality of composite stiffeners and a composite skin. The apparatus comprises a tool adapted to have a composite skin placed thereon, the tool including a plurality of channels therein, each of the channels adapted to have a composite stiffener placed therein and contact with the skin. The apparatus further comprises a bag adapted to be placed over the skin and exposed to autoclave pressure for compacting the skin against the stiffeners, and a plurality of bladders respectively adapted to be placed within the stiffeners for reacting autoclave pressure applied to the stiffeners through the vacuum bag. The apparatus also includes a manifold system located along one end of the tool channels and disposed beneath the bag for coupling the bladders with autoclave pressure. The manifold system includes a manifold box having a top wall adapted to be engaged by the bag, a vent tube passing through the top wall of the manifold box and through the bag, and lines coupling the vent tube with ends of the bladders. The apparatus may further comprise a seal between the vent tube and the bag for sealing the bag to the vent tube, as well as a frame, and clamps for clamping the periphery of the bag between the tool and the frame. The manifold system is located inside of the sealed periphery of the bag. Each of the bladders is elongate and includes a vent fitting on one end thereof, and the manifold system is releasably coupled with each of the vent fittings. The manifold system includes a plurality of manifold boxes arranged end-to-end and each having a top, a plurality of vent tubes respectively passing through the tops of the manifold boxes and through the bag. The vent tubes are coupled with ends of the bladders and are sealed to the bag.

According to still another embodiment, a method is provided of co-curing composite stiffeners and a skin within an autoclave. The method comprises placing the uncured stiffeners on a tool, placing bladders respectively in the uncured stiffeners, placing an uncured skin over the tool and in contact with the stiffeners, coupling the bladders with a manifold, sealing a bag over the tool and the manifold, venting the manifold to autoclave pressure through the bag, and pressurizing the bladders using autoclave pressure through the manifold. Coupling the bladders with the manifold includes coupling the ends of the bladders with a vent tube exposed to the autoclave pressure. Sealing the bag includes sealing the bag around the vent tube. Coupling the bladders with the manifold includes coupling the ends of multiple ones of the bladders with the vent tube. Sealing the bag includes placing a frame over the bag and the tool, and clamping the bag between the frame and the tool. The manifold may include a plurality of manifold boxes and the method may further comprise placing the manifold boxes end-to-end on the tool and along one end of the bladders, and coupling each of the manifold boxes with a plurality of the bladders.

According to still further embodiment, a method is provided of distributing the pressure applied to composite parts during autoclave curing of the parts. The method comprises placing the composite parts on a tool, placing bladders within the parts to react autoclave pressure, arranging multiple manifold boxes along one side of the tool, coupling each of the manifold boxes to at least one of the bladders, sealing a vacuum bag over the tool and the manifold boxes, and venting each of the manifold boxes through the vacuum bag. Venting each of the manifold boxes through the vacuum bag includes passing vent tubes through the vacuum bag and sealing each of the vent tubes to the vacuum bag. Coupling each of the manifold boxes to at least one of the bladders includes using a quick disconnect to connect a manifold line to a vent inlet fitting on the bladder.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
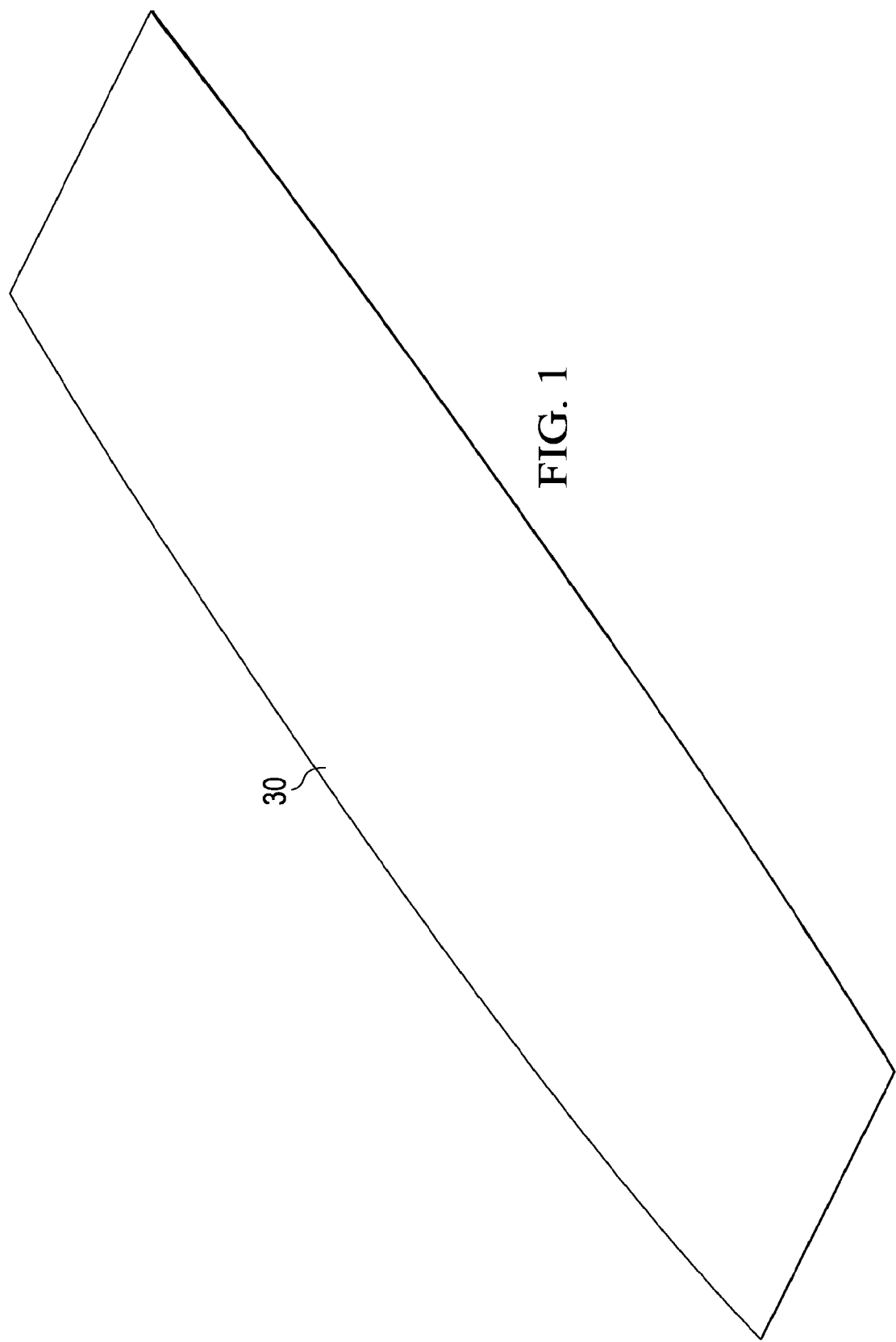
FIG. 1 is an illustration of a top perspective view of a stiffened composite skin.
Figure 2:
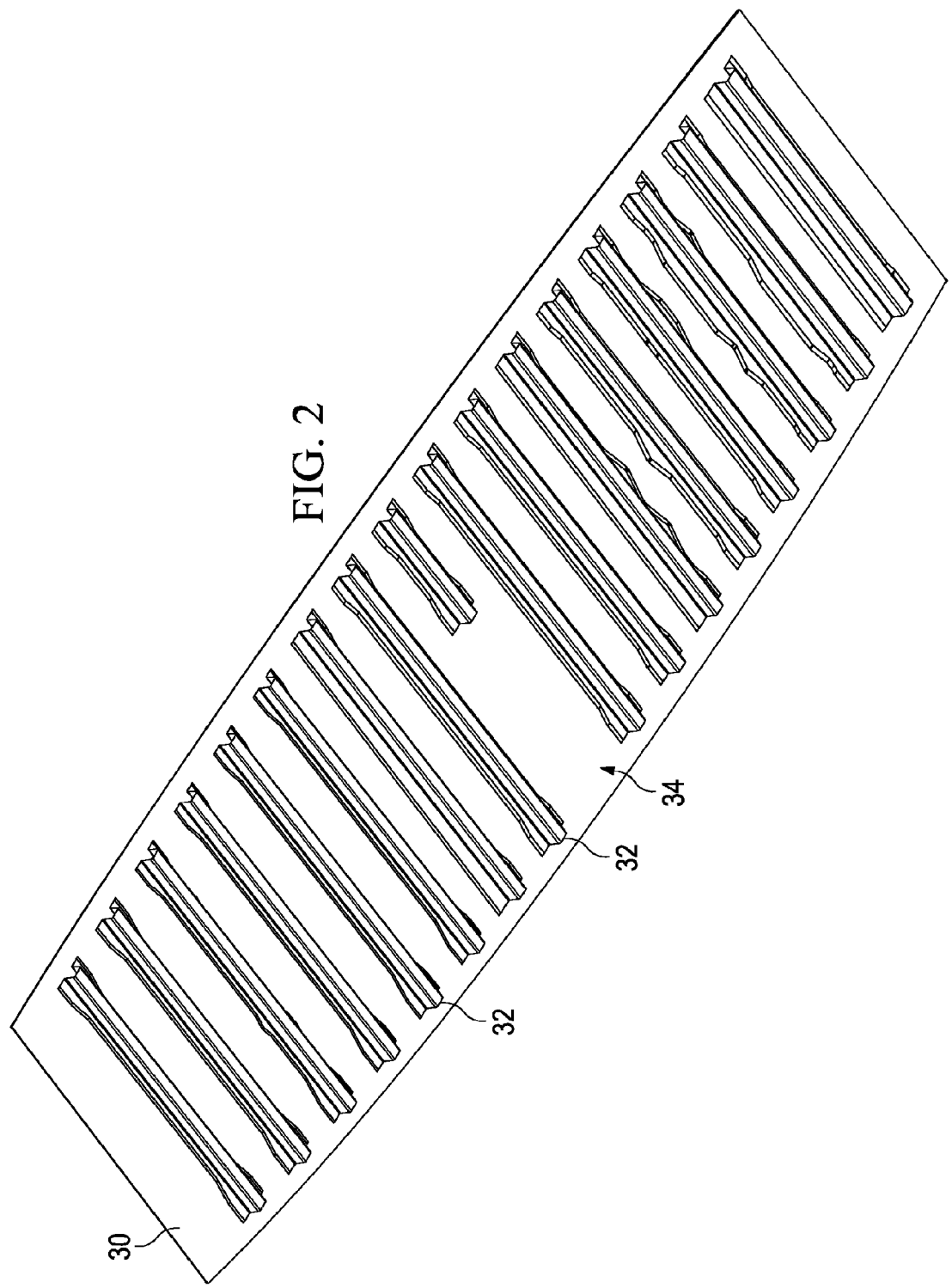
FIG. 2 is an illustration of a bottom perspective view of the stiffened skin shown in FIG. 1, revealing stiffeners that are co-cured with the skin in an autoclave.
Figure 3:
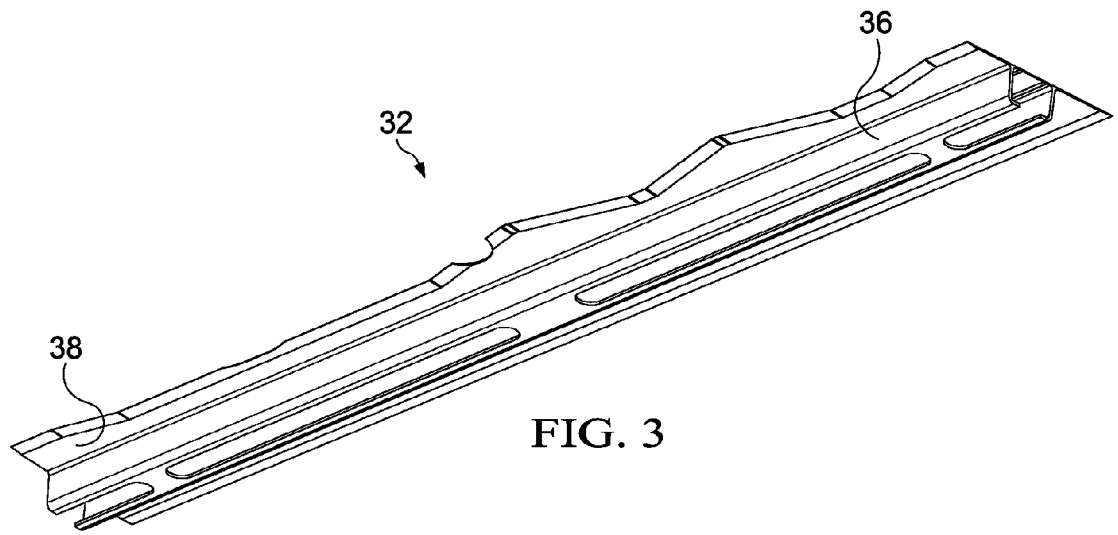
FIG. 3 is an illustration of a perspective view of a hat type stiffener that may be used to stiffen the skin shown in FIGS. 1 and 2.
Figure 4:
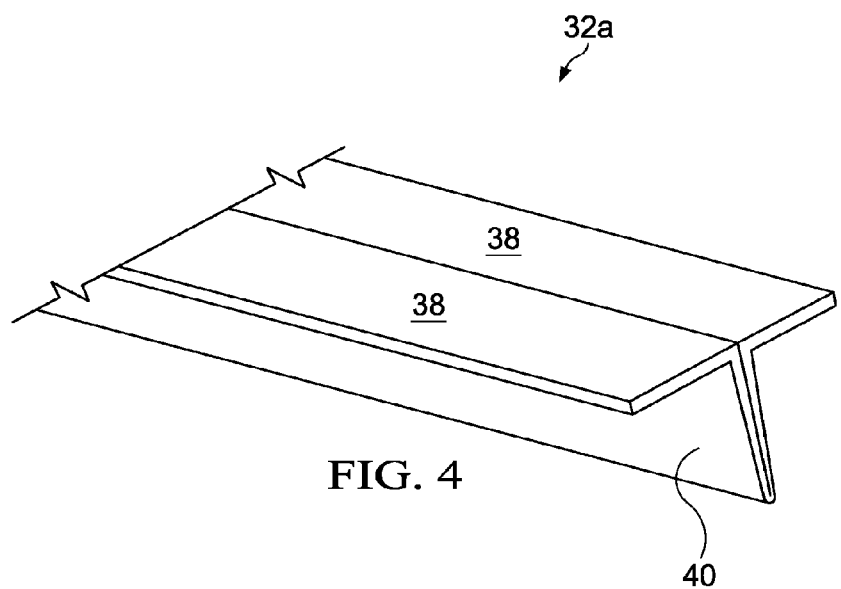
FIG. 4 is an illustration of a portion of a blade type stiffener.

Referring first to FIGS. 1 and 2, the disclosed embodiments relate to a method and apparatus for fabricating a fiber reinforced, composite laminate skin 30 stiffened with composite laminate stiffeners 32 which are co-cured with the bottom side 34 of the skin 30. As will be discussed below in more detail, the skin 30 and the stiffeners 32 are laid up and formed to shape, as required, and then co-cured in an autoclave (not shown in FIGS. 1 and 2). The stiffeners 32, sometimes referred to as stiffener ribs, may be any of several well-known types. For example, as shown in FIG. 3, the stiffeners 32 may be a hat shaped stiffener 32 having a hat section 36 and a flange section 38 that is attached to the bottom side 34 of the skin 30 during the co-curing process. FIG. 4 illustrates another type of stiffener 32a referred to as a blade stiffener 32a having a blade or web section 40 and a flange section 38.

Figure 5:
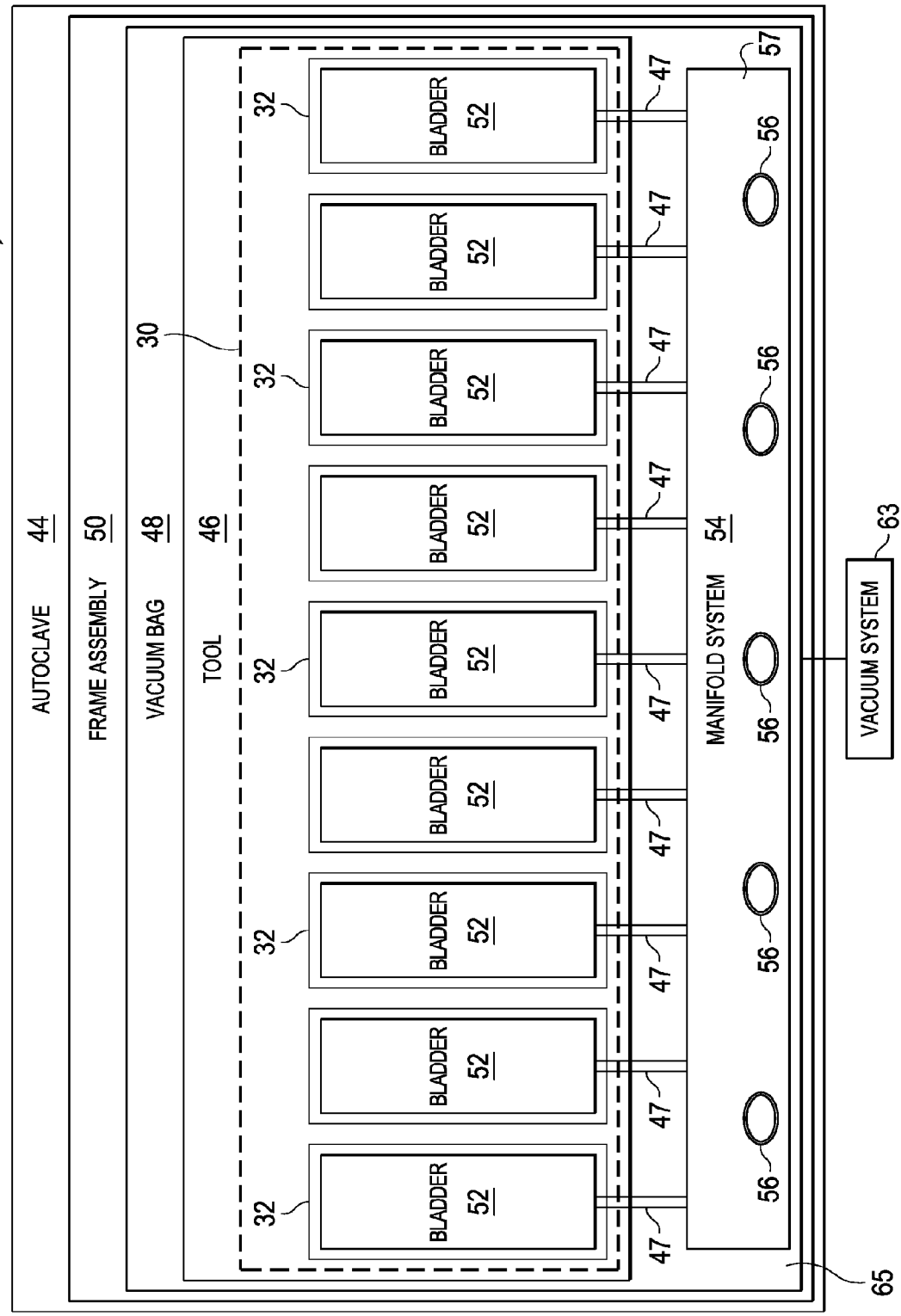
FIG. 5 is an illustration of a functional block diagram of apparatus for co-curing a skin and stiffeners in an autoclave.

Referring now to FIG. 5, the skin 30 and the stiffeners 32 may be co-cured in an autoclave 44 using an apparatus generally indicated by the 42. The apparatus 42 broadly comprises a tool 46 over which a reusable vacuum bag 48 may be sealed. The tool 46 is configured to have a plurality of uncured composite stiffeners 32, sometimes referred to as stiffener charges, placed therein. A bladder 52 is placed inside each of the stiffeners 32 in order to react compaction pressure applied by the autoclave 44 and by the vacuum bag 48. An uncured composite skin (not shown in FIG. 5) is placed on the tool 46, overlying and in contact with the flange sections 38 of the uncured stiffeners 32. A vacuum system 63 coupled with the apparatus 42 is used to draw a vacuum within the vacuum bag 48 in order to draw the vacuum bag down against the skin 30, compacting the skin 30 against the flange sections 38 (FIGS. 3 and 4) of the stiffeners 32 during the curing process. In order to vent the bladders 52 to the autoclave pressure so that the bladders 52 to do not collapse, a manifold system 54 is coupled 47 with each of the bladders 52. The manifold system 54 includes one or more manifold boxes 57 which may be arranged end-to-end along one side 65 of the tool 46, spaced slightly from the ends of the bladders 52. Each of the manifold boxes 57 is positioned beneath the vacuum bag 48 during a curing cycle, and includes a vent tube 56 that extends upwardly through the vacuum bag 48 at a location that is outside of the boundaries of the tool 46. The vent tubes 56 extends into the environment of the autoclave 44, allowing autoclave pressure to be internally applied to the bladders 52; in other words, the manifold system 54 equalizes the pressure between environment of the autoclave 44 and the internal volume of the bladders 52.

Figure 6:
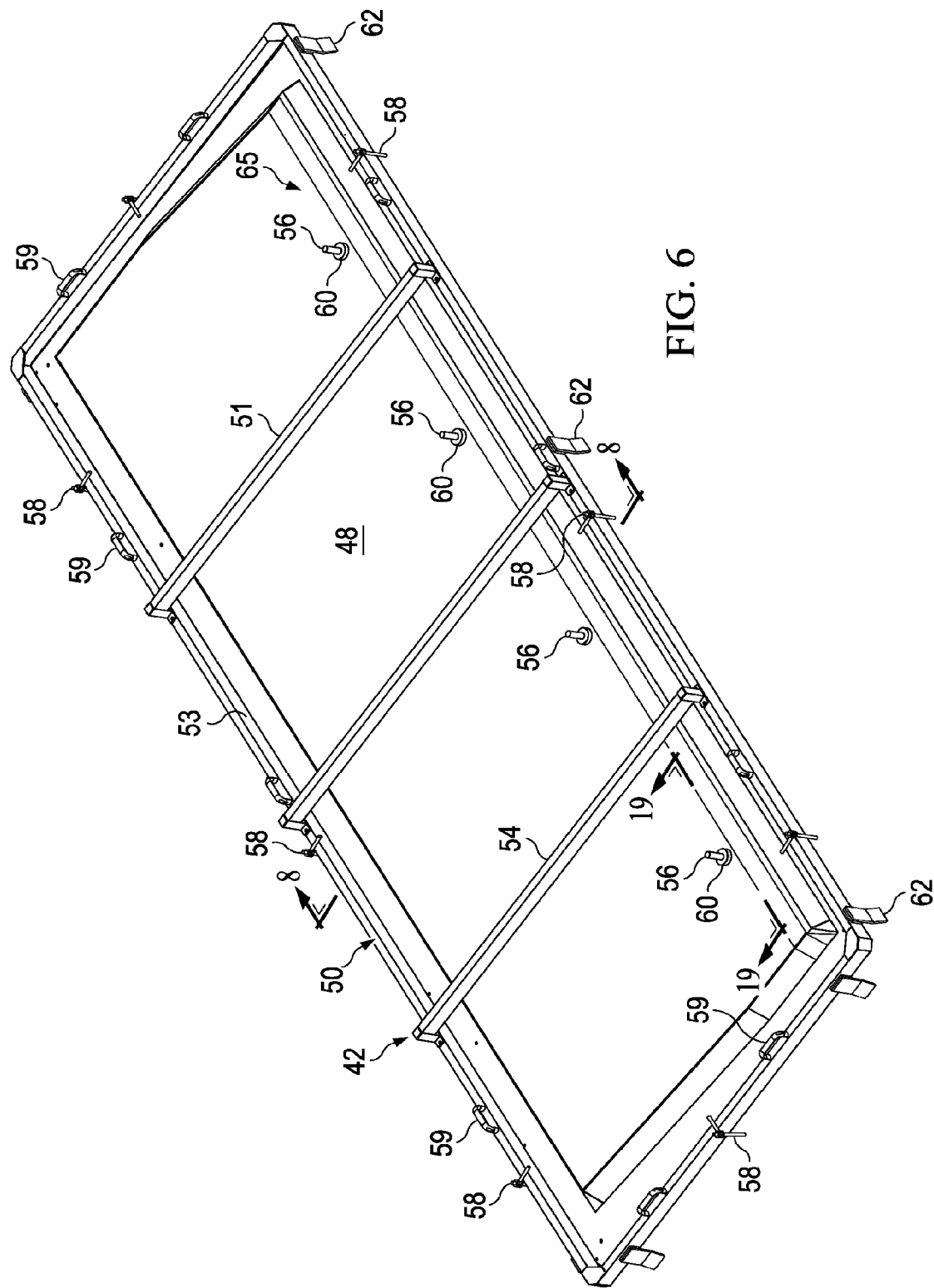
FIG. 6 is an illustration of a top perspective view of one embodiment of the apparatus shown in FIG. 5.
Figure 7:
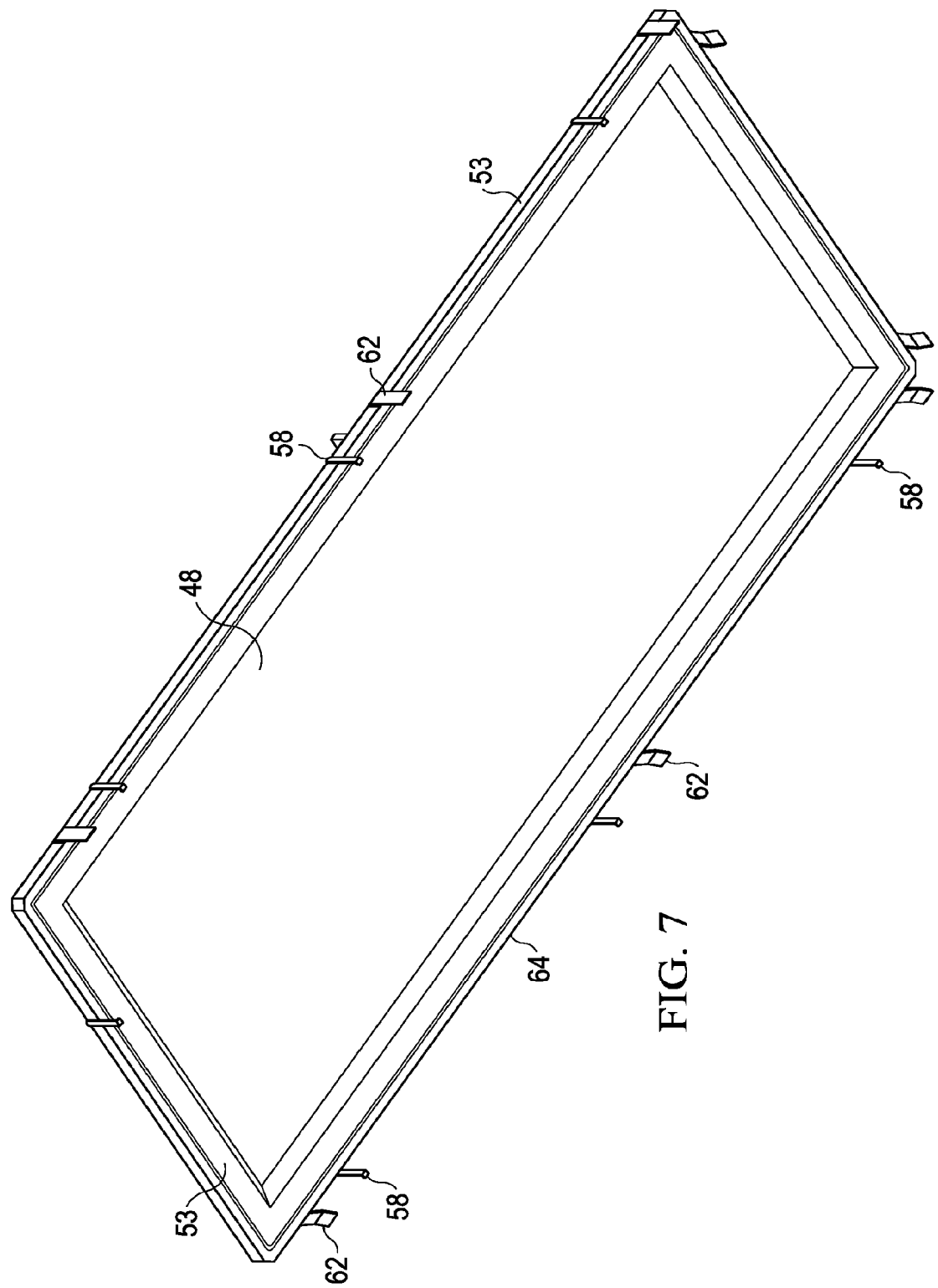
FIG. 7 is an illustration of a bottom perspective view of the apparatus shown in FIG. 6, the tool and tool base not shown for clarity.
Figure 8:
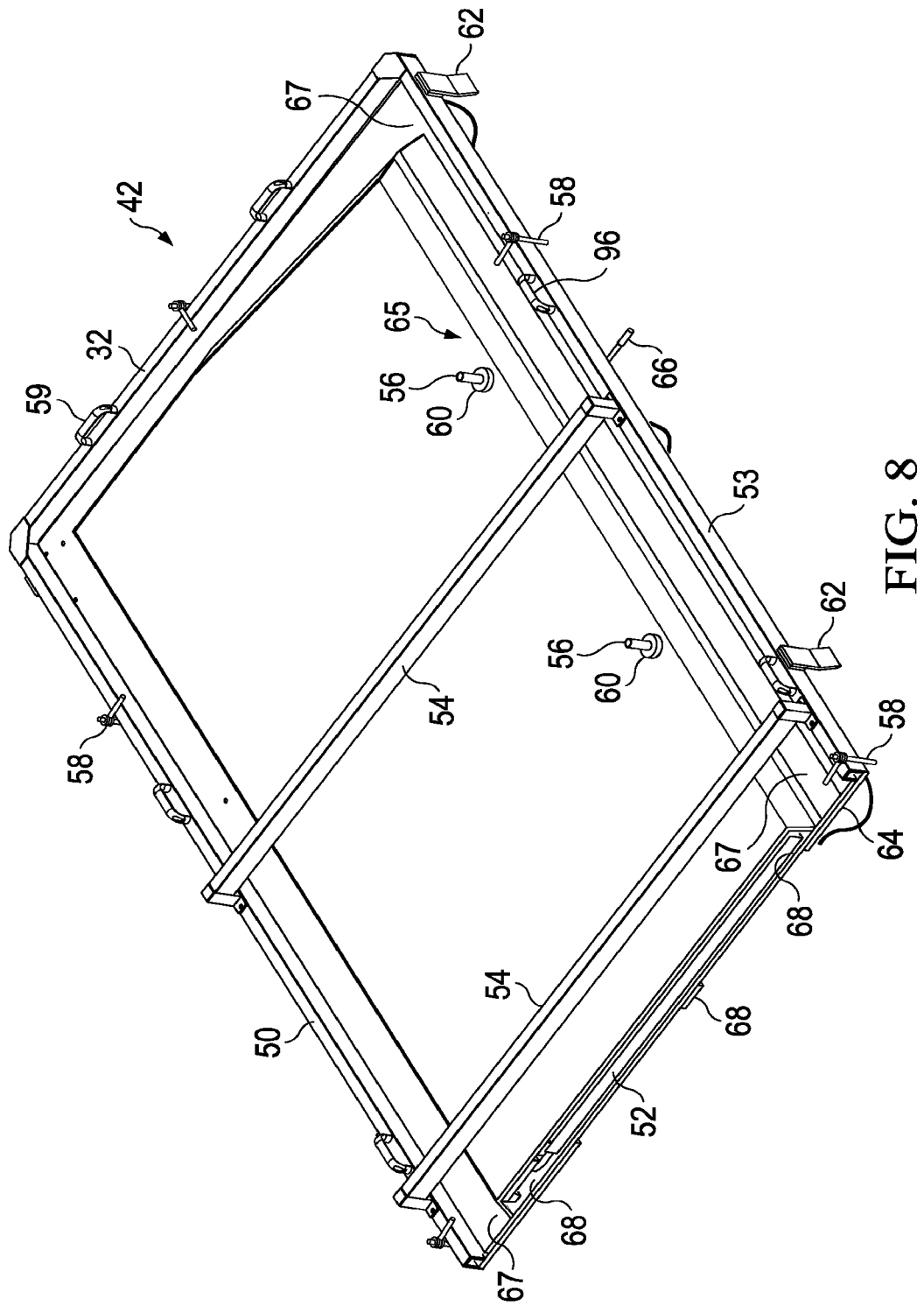
FIG. 8 is an illustration of a sectional view taken along the line 8-8 in FIG. 6.

Attention is now directed to FIGS. 6, 7, 8 which illustrate additional details of the apparatus 42. The apparatus 42 broadly comprises a frame assembly 50 to which a reusable vacuum bag 48 is attached. The vacuum bag 48 may comprise, for example and without limitation, an elastomer or other material that may withstand repeated pressure cycling and reuse. The frame assembly comprises a generally rectangular outer frame 53 formed of rigid material such as a metal, and reinforcing cross frame members 51 attached to the outer frame 53. The vacuum bag 48 may be attached to the outer frame 53 and covers the entire area of both the tool 46 and the manifold system 54.

The frame assembly 50 may also include handles 59 as well as clamps 58 around the periphery of the outer frame 53. The handles 59 allow the frame assembly 50, along with the vacuum bag 48, to be manually lifted away to permit loading and unloading of the skin 30 and the stiffeners 32 (not shown in FIGS. 6-8). The outer frame may be also provided with guides 62 order to aid assembly alignment when the frame assembly 50 is lowered down over the tool 46 (FIG. 5). As best seen in FIG. 8, the vacuum bag 48 includes a peripheral flat bag edge that is adapted to be clamped against a tool base plate 68 by a clamping plate 67 forming part of the frame assembly 50. Actuation of the clamps 58 load the outer frame 53 against the tool 46, thus clamping plate 67 against the peripheral flat bag edge 64 to create a vacuum tight seal between the vacuum bag 48 and the tool 46.

The vent tubes 56 are arranged along one side of the vacuum bag 48 and pass upwardly through openings in the vacuum bag 48 defined by circular, vent tube ring seals 60. The vent tube ring seals 60 slidably receive the vent tubes 56 when the frame assembly 50 is lowered down onto the tool 46 in preparation for a curing cycle, and form a substantially vacuum tight peripheral seal between the vacuum bag 48 and the vent tubes 56. In some embodiments, it may be possible to orient the vent tubes 56 downwardly such that they do not penetrate the vacuum bag 48. One or more vacuum line fittings 66 may be provided to connect the interior of the vacuum bag 48 with a suitable vacuum system 63 (FIG. 3) in order to evacuate the vacuum bag 48, causing the vacuum bag 48 to be drawn down against the tool 46 and the manifold boxes 57.

Figure 9:
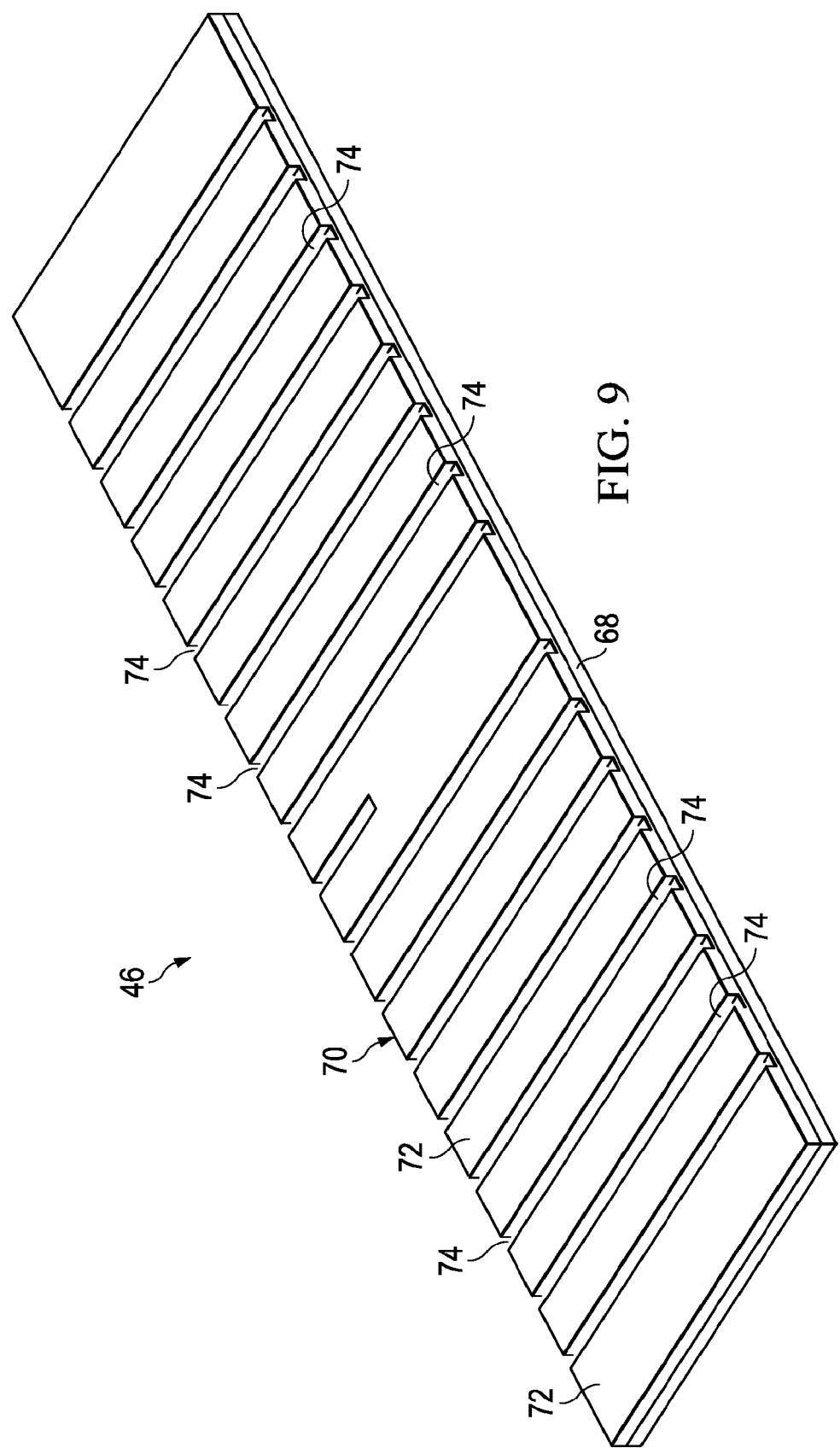
FIG. 9 is an illustration of a top perspective view of a tool forming part of the apparatus shown in FIGS. 5-8.
Figure 10:
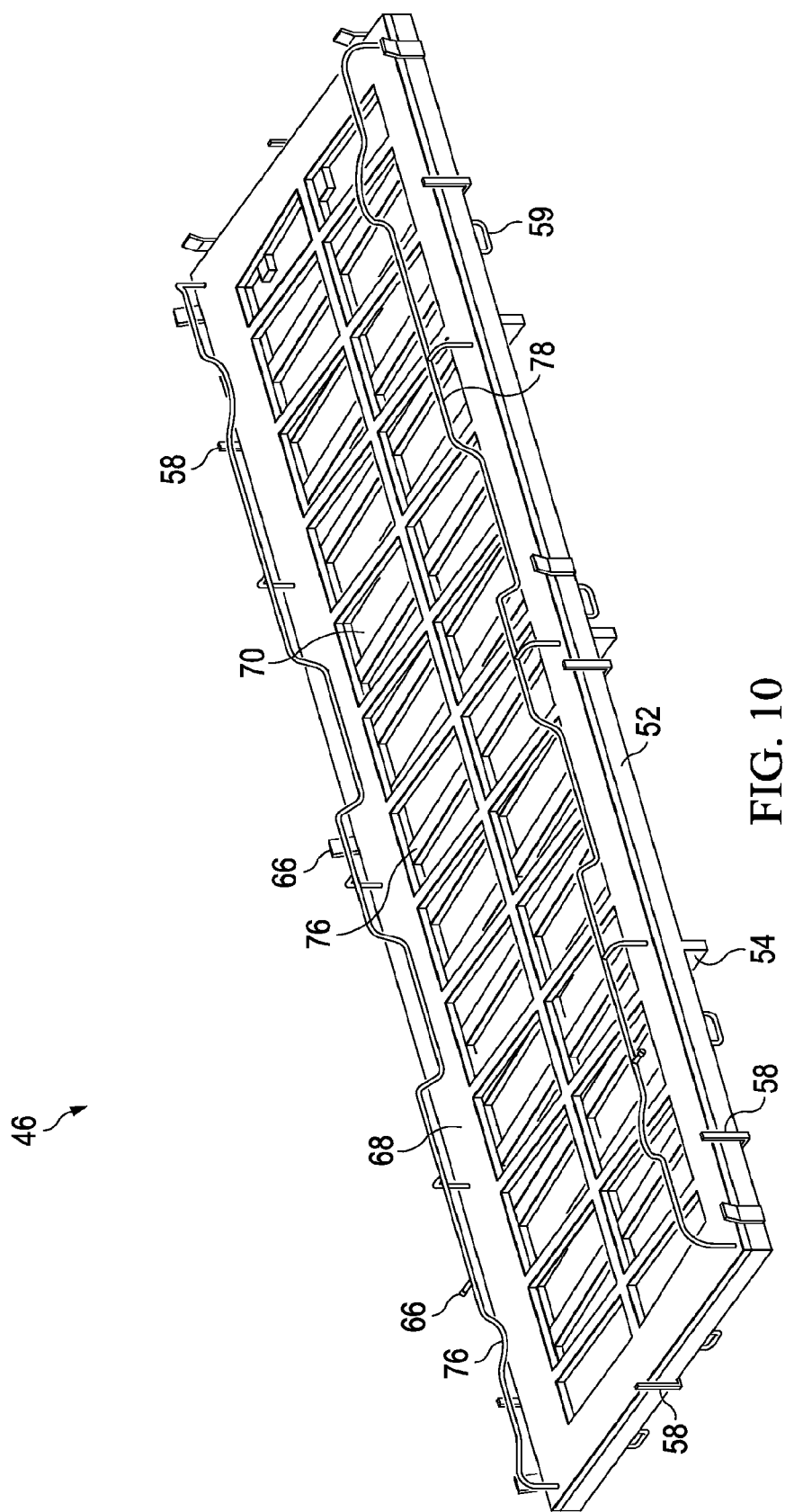
FIG. 10 is an illustration of a bottom perspective view of the apparatus shown in FIGS. 5-8, also showing the tool.
Figure 11:
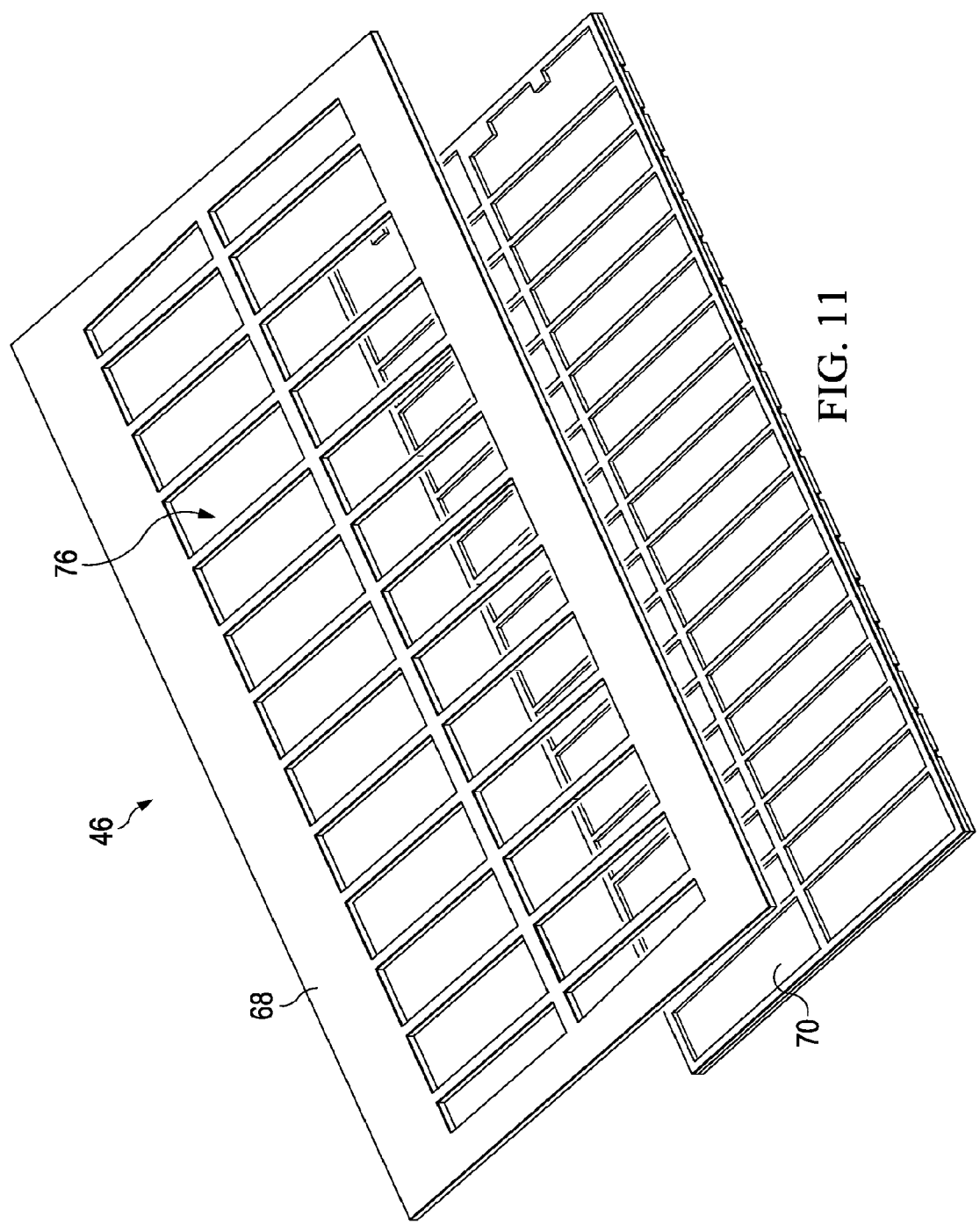
FIG. 11 is an illustration of an exploded perspective view of the bottom tool shown in FIG. 10.

FIGS. 9, 10a and 11 illustrate additional details of one typical form of the tool 46 shown in FIG. 5. The tool 46 includes a tool billet 70 and an underlying tool base plate 68 that is attached to the tool billet 70, as by welding or other suitable techniques. The tool billet 70 may comprise a solid piece of material, such as metal in which channels 74 may be formed, as by machining. The channels 74 each have a cross-sectional shape corresponding to a portion of the stiffener 32, such as the hat section 36 of the stiffener 32. The tool billet 70 also has an upper tool surface 72 against which the flange section 38 of the stiffener 32 rests, along with the skin 30.

As shown in FIG. 10, the tool base plate 68 may include a plurality of tool base plate openings 76 therein which, in the illustrated example are generally rectangular in shape. The tool base plate openings 76 allow access to the bottom side of the tool billet 70 and allow air to circulate around the backside of the tool billet 70 in order to promote more even heating/cooling, as well as quicker heat up and cool down of the tool 46. The tool base plate 68 provides the tool billet 70 with the required rigidity, allowing a thinner tool billet 70 to be used which may reduce material costs and tool weight. However, in other embodiments, a tool base plate may not be required where the tool billet 70 is sufficiently thick to provide the required rigidity. FIG. 10 also reveals the placement of vacuum lines 78 through the tool base plate 68 which are coupled with the vacuum line inlet fittings 66 and top of the tool billet 70 to allow evacuation of the vacuum bag 48.

Figure 12:
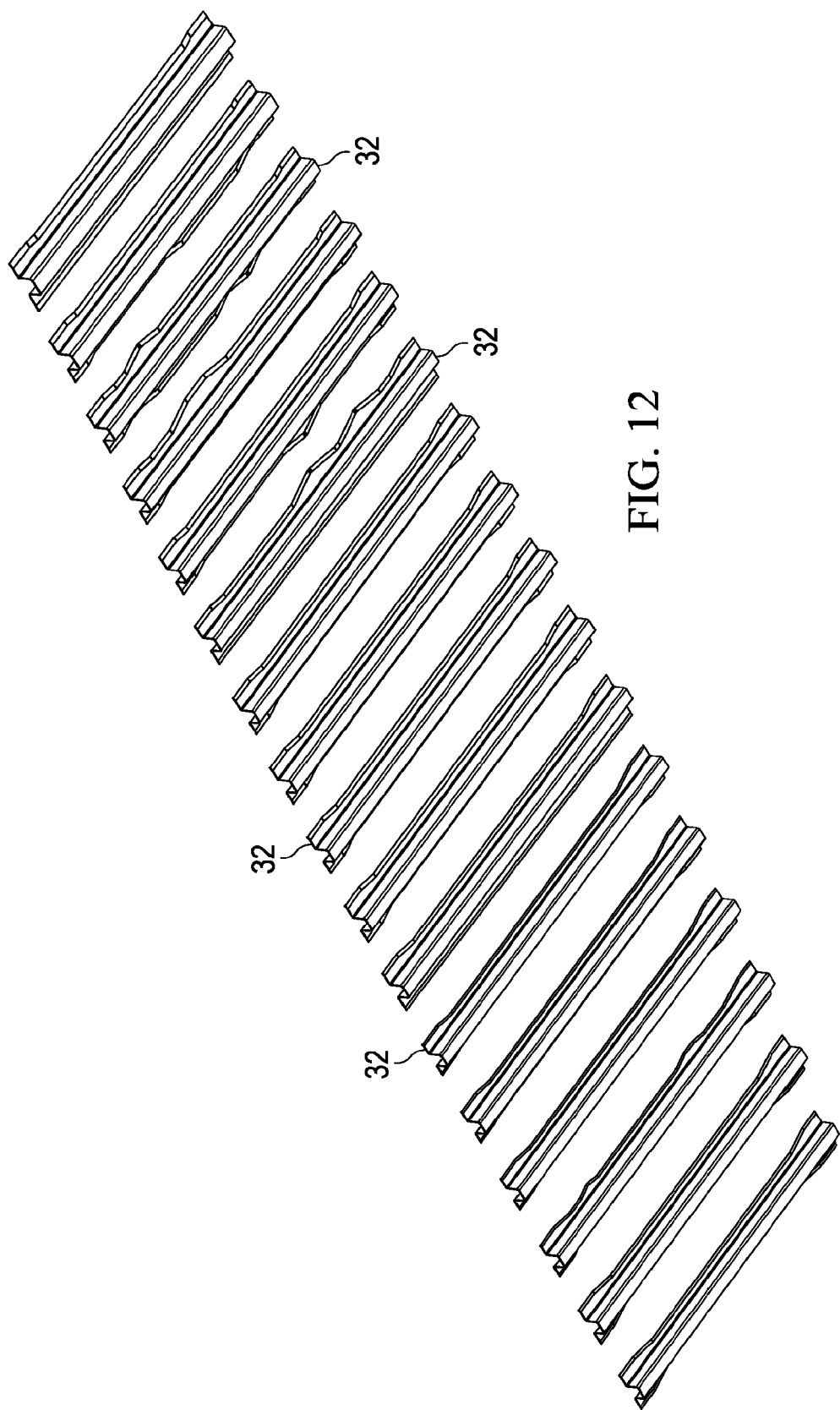
FIG. 12 is an illustration of a perspective view of an array of stiffeners used to stiffen the skin shown in FIGS. 1 and 2.
Figure 13:
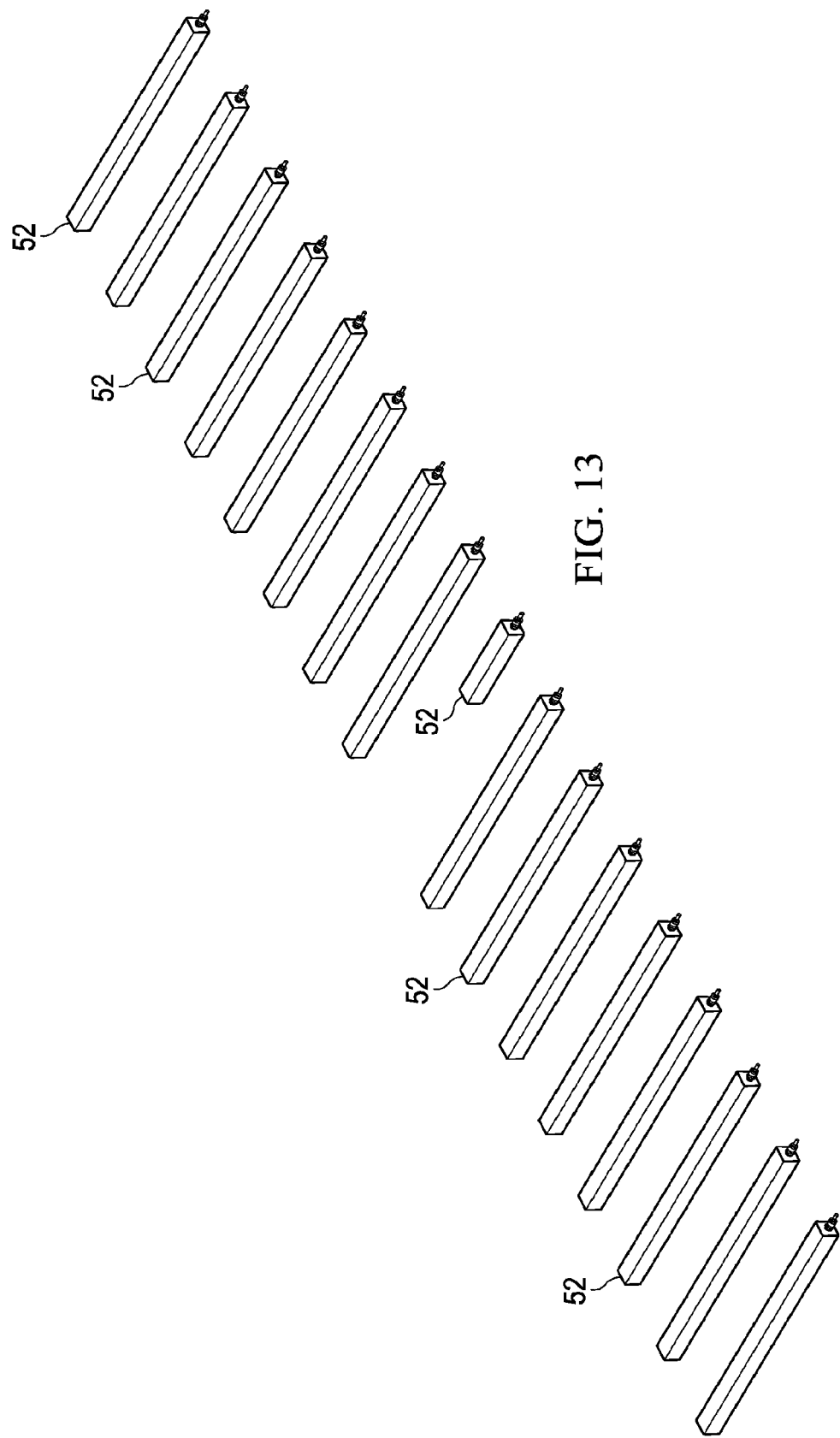
FIG. 13 is an illustration of a perspective view of an array of bladders respectively placed in the stiffeners shown in FIG. 12 during autoclave curing.
Figure 14:
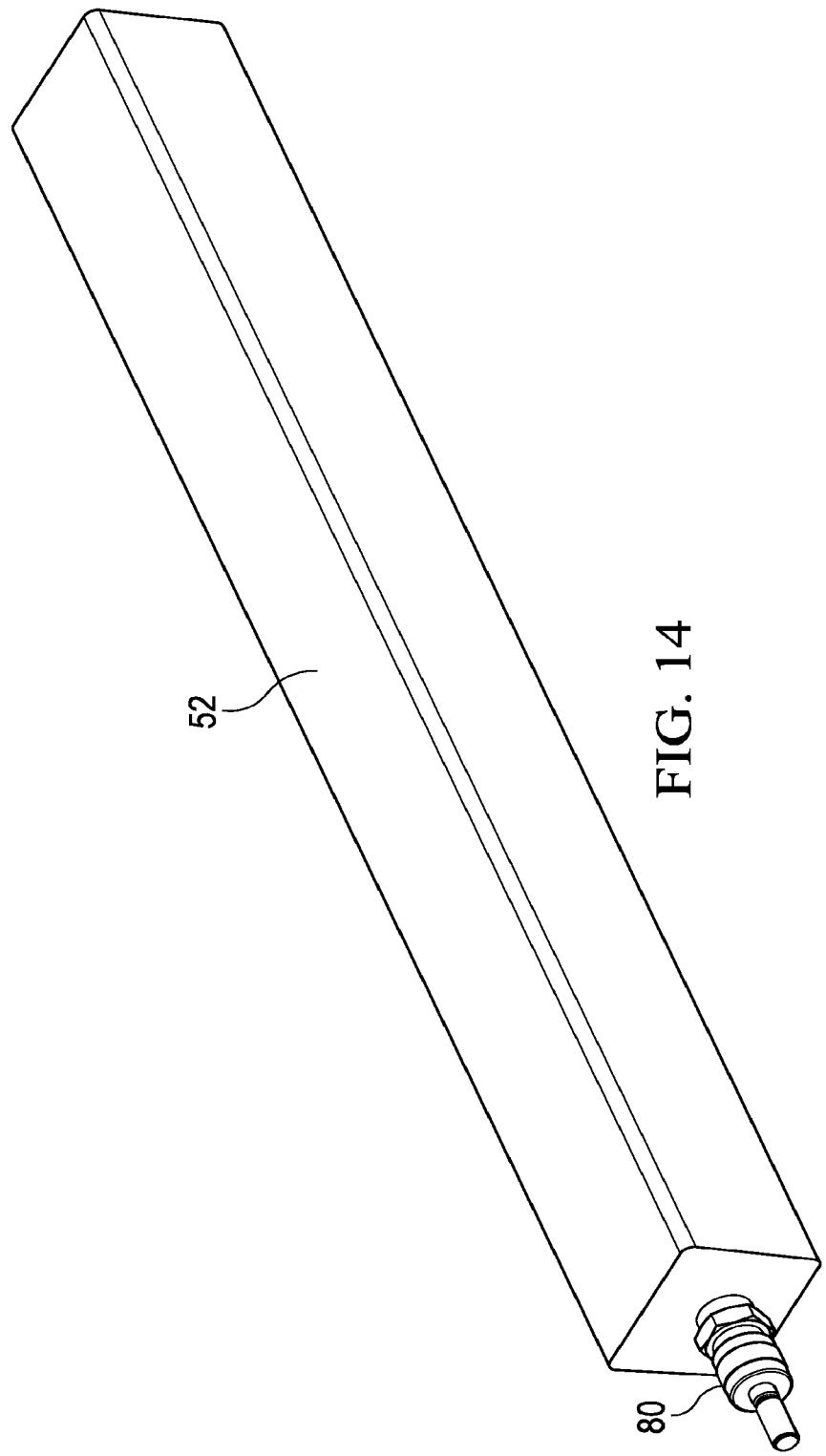
FIG. 14 is an illustration of a perspective, end view of one of the bladders shown in FIG. 13, illustrating the bladder vent fitting.

As previously mentioned, preformed, uncured stiffeners 32 are placed in the channels 74 of the tool billet 70, in preparation for a curing cycle. In the case of the stiffened skin 30 shown in FIGS. 1 and 2, the tool billet 70 is loaded with an array of uncured stiffeners 32, as shown in FIG. 12. FIG. 13 illustrates a corresponding array of bladders 52 that are respectively placed in the uncured stiffeners 32 which have been previously seated in the channels 74 of the tool billet 70. Generally, the bladders 52 will have a cross-sectional shape and length that substantially match that of the uncured stiffeners 32. In some applications, depending upon the configuration of the part assembly, the various ones of the stiffeners 32, along with the bladders 52 may have differing cross-sectional shapes and/or lengths. FIG. 14 illustrates one of the bladders that has a generally square cross-sectional shape suited to form the hat section 36 of the stiffener 32 shown in FIGS. 2 and 3. As previously mentioned, the bladder 52 may be formed of a generally flexible, impermeable material such as an elastomeric rubber. Each of the bladders 52 includes a bladder vent fitting 80 which may form part of a quick disconnect adapted to releasably connect the bladders 52 with the manifold system 54 (FIG. 5).

Figure 15:
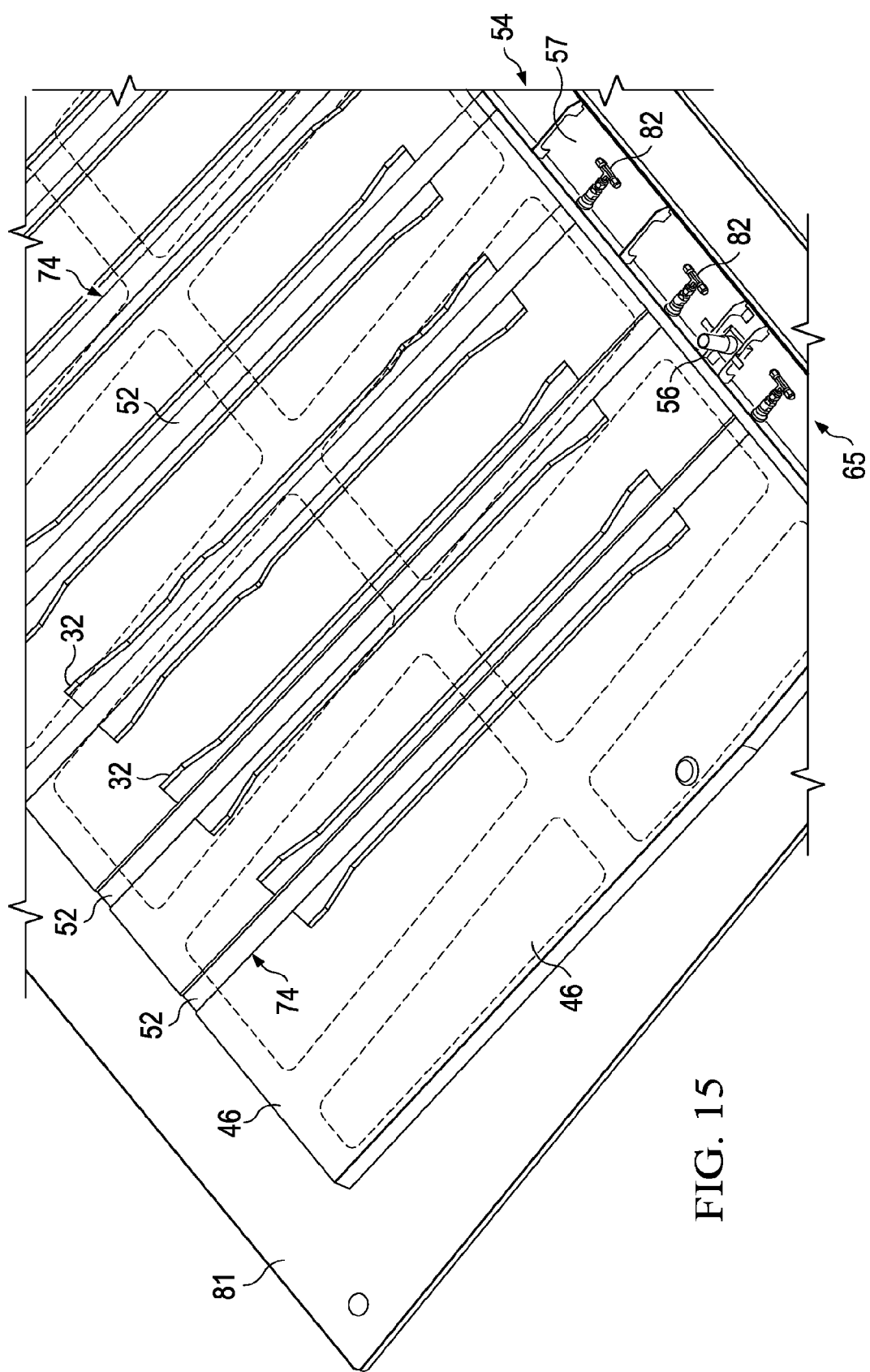
FIG. 15 is an illustration of a perspective view of the apparatus, the frame and vacuum bag removed for clarity to reveal the location of the stiffeners and the bladders.

FIG. 15 illustrates the tool 46 supported on a tool base 81, with uncured stiffeners 32 having been loaded into the channels 74 of the tool billet 70, with bladders 52 placed inside of the stiffeners 32. Each of the manifold boxes 57 includes manifold fittings 82 that are coupled with the bladder vent fittings 80 (FIG. 14), with each other and with a vent tube 56 by later discussed air lines or hoses (not shown in FIG. 15). As can be seen in this Figure, the manifold boxes 57, including the manifold fittings 82 and the vent tubes 56 are located along one side of the tool 46, at one end of the bladders 52, beneath the vacuum bag 48 when the frame assembly 50 is installed over the tool 46.

Figure 16:
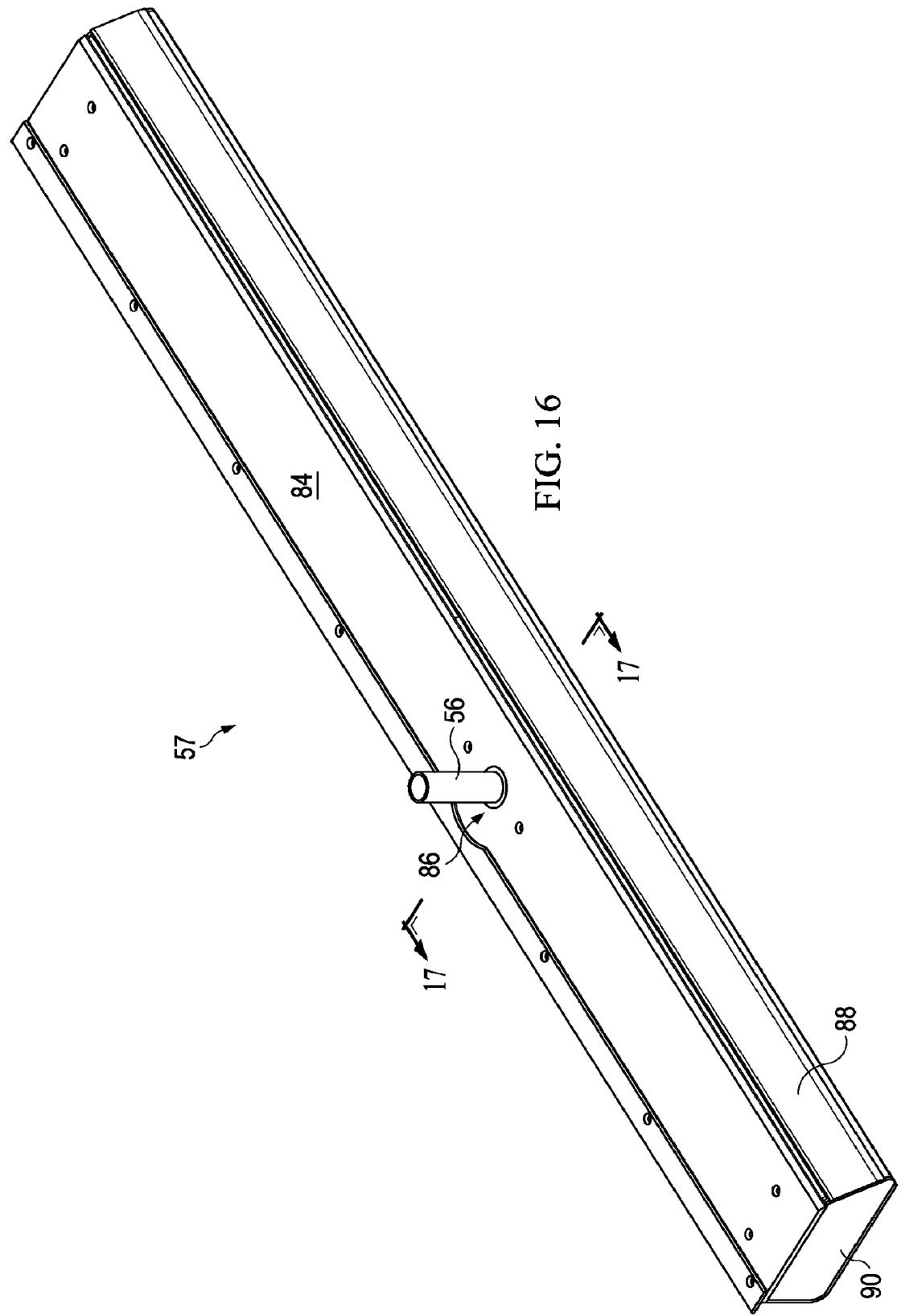
FIG. 16 is an illustration of a perspective view of one of the manifold boxes forming part of the manifold system.
Figure 17:
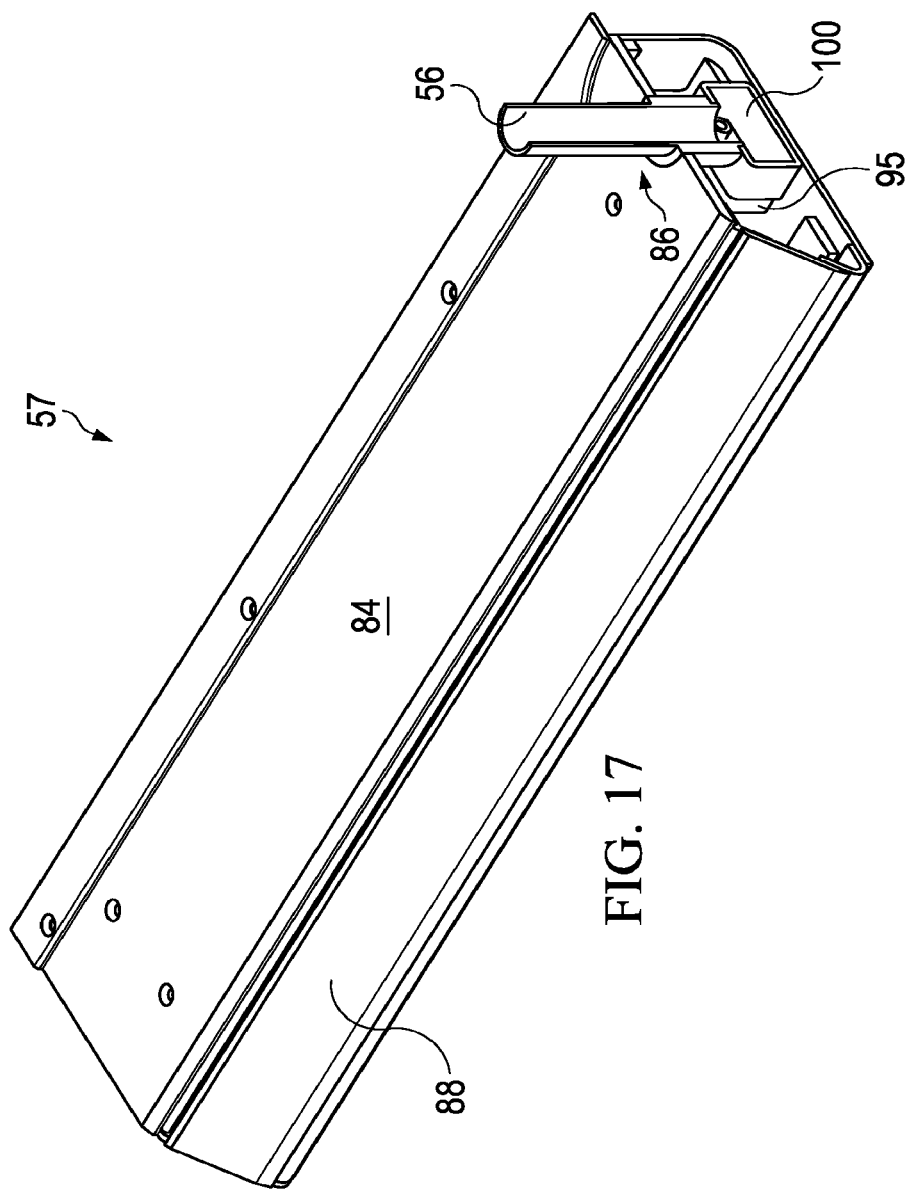
FIG. 17 is an illustration of a sectional view taken along the line 17-17 in FIG. 16.
Figure 18:
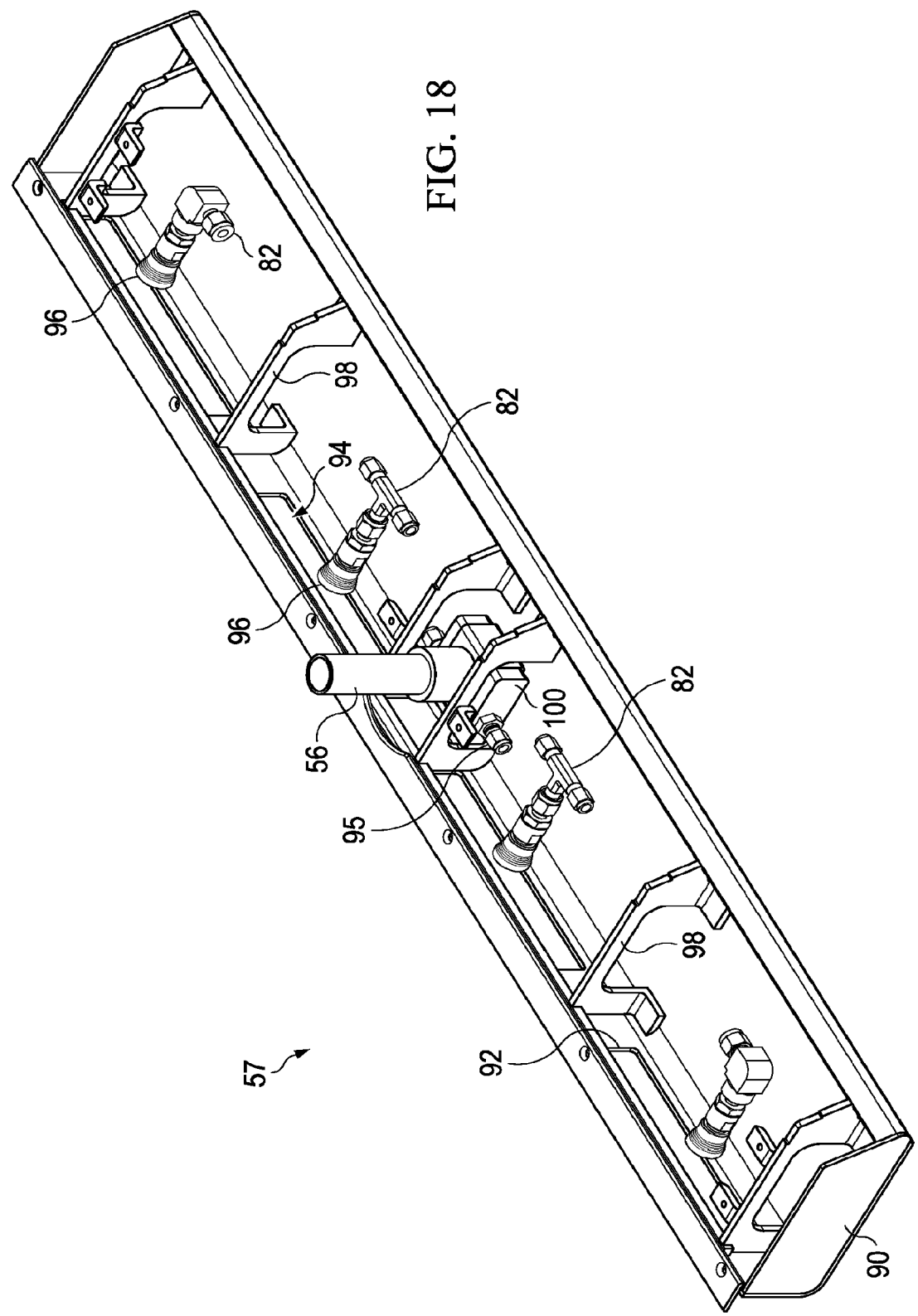
FIG. 18 is an illustration similar to FIG. 16, but showing the cover of the manifold box having been removed, the connecting hoses for the fittings not shown for clarity.
Figure 19:
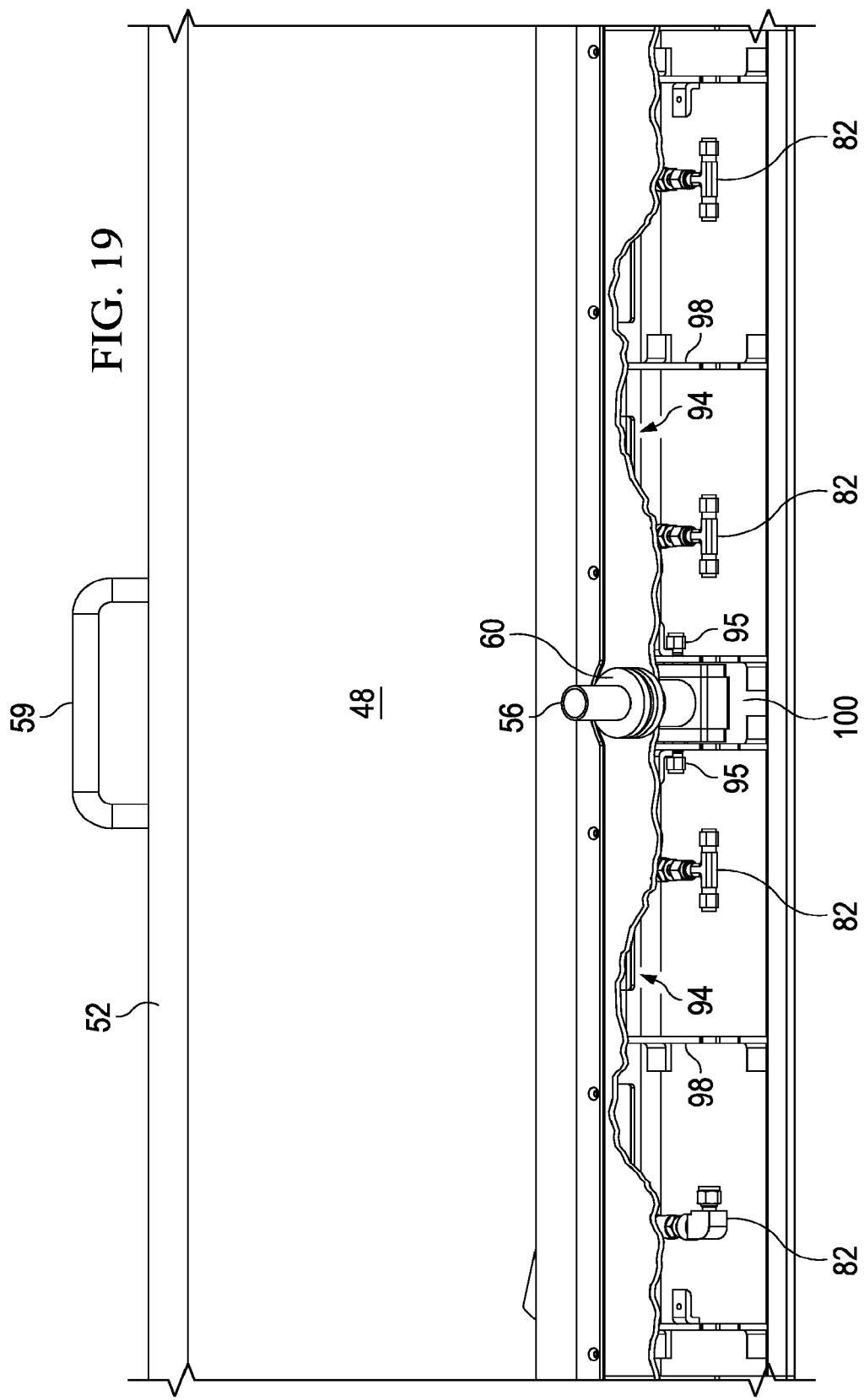
FIG. 19 is an illustration of a sectional view taken along the line 19-19 in FIG. 6, the connecting hoses between the fittings not shown for clarity.

Attention is now directed to FIGS. 16-19 which illustrate additional details of one of the manifold boxes 57. The manifold box 57 may be formed of any suitable rigid material, such as sheet metal, and has a generally open interior. When arranged end-to-end, end walls 90 of the manifold boxes 57 are positioned side-by-side. As best seen in FIGS. 16 and 17, the manifold box includes a substantially flat top wall 84, and an outer, inclined sidewall 88. The top wall 84 includes a vent tube opening 86 through which a vent tube 56 extends upwardly beyond the top wall 84. As previously mentioned, however, the vent tube 56 may extend downwardly through the bottom of the manifold box 57 and the tool base 81 (FIG. 15), thereby avoiding penetration of the vacuum bag 48. The top wall 84 and the inclined sidewall 88 may be of one-piece construction, or may be separate pieces, and are each removable to allow service personnel to access the open interior of the manifold box 57. As best seen in FIGS. 18 and 19, the manifold box 57 may further include a plurality of longitudinally spaced, stiffening ribs 98.

Figure 20:
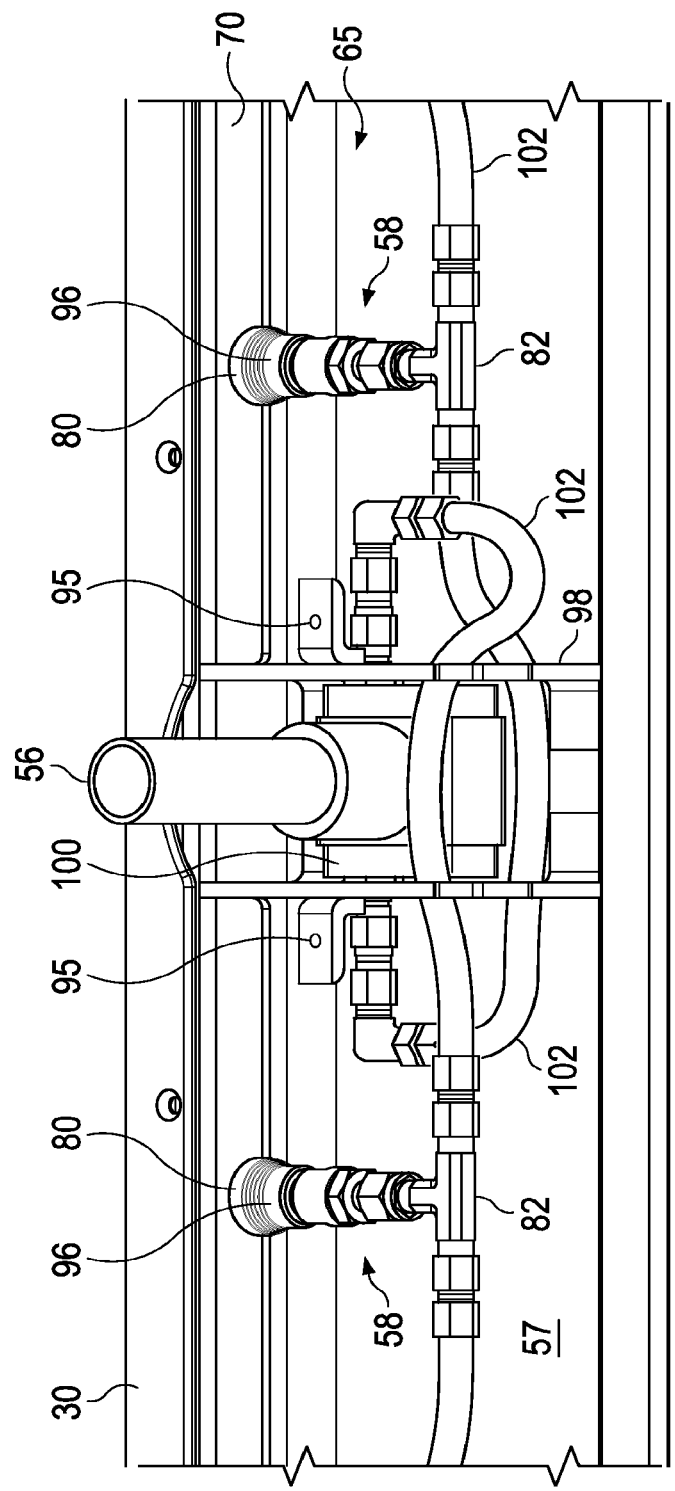
FIG. 20 is an illustration of an isometric view of a portion of one of the manifold boxes with the cover removed to reveal a vent tube and two adjoining manifold fittings.

As best seen in FIGS. 17, 19 and 20, the vent tube 56 is mounted on a vent tube base 100 which has a generally open interior and is provided with fittings 95 that may be connected to fittings 82 by suitable hoses or airlines 102, as shown in FIG. 20. As can be seen in FIGS. 18 and 19, the manifold box 57 has sidewall openings 94 facing the tool 46 which permit the fittings to be connected to the vent fittings 80 on each bladder 52 using the quick disconnects 96. The quick disconnects 96 allow each of the manifold boxes 57 to be disconnected from the bladders 52. Once disconnected, one or more of the manifold boxes 57 may be removed, as necessary in order to reconfigure the manifold system 54 to suit the particular part assembly to be cured. For example, the stiffened skin shown in FIGS. 1 and 2 employ four of the manifold boxes 57 arranged end-to-end in order to deliver autoclave pressure to the bladders 52 (FIG. 13) placed in the corresponding stiffeners 32 (FIG. 12). In the event that a stiffened skin 30 requires a fewer number of the stiffeners 32 (thus requiring fewer of the bladders 52), one or more of the manifold boxes 57 may be removed simply by lifting them away from the tool base 81 (FIG. 15).

Figure 21:
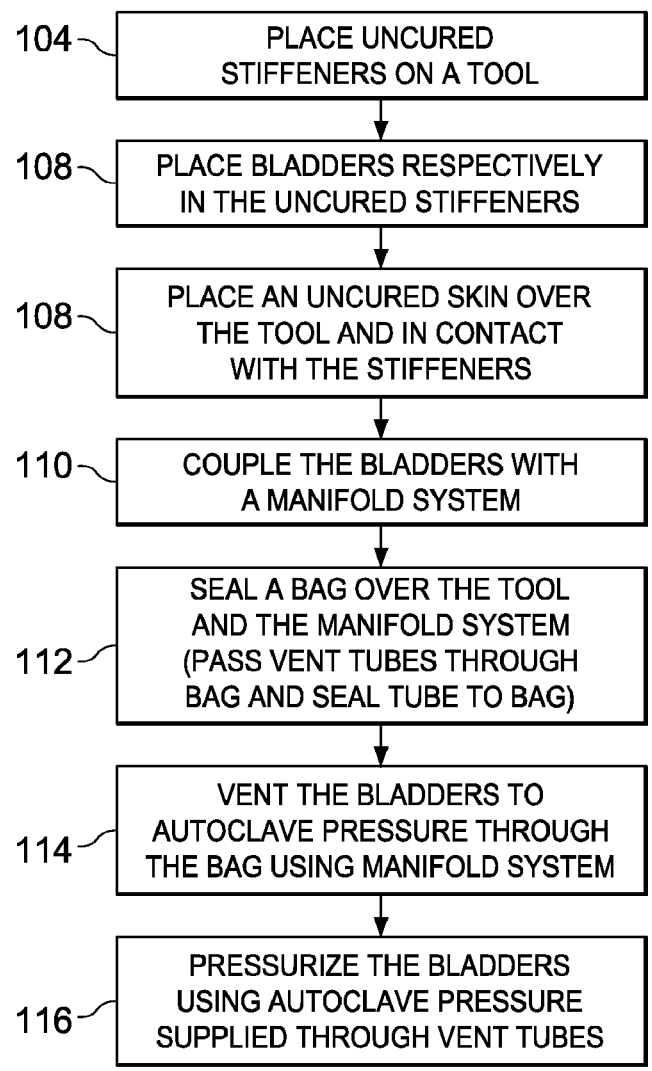
FIG. 21 is an illustration of a flow diagram of a method of co-curing a composite skin and stiffeners in an autoclave.

The apparatus 42 described above may be employed to co-cure skins 30 and stiffeners 32 in an autoclave using the method shown in FIG. 21. Beginning at step 104, preformed, uncured composite laminate stiffeners 32 are placed on a tool 46, following which bladders 52 are placed in the stiffeners 32 at 106. Next, at 108, an uncured composite laminate skin 30 is placed over the tool 46, and brought into contact with the stiffeners 32. At step 110, each of the bladders 52 is coupled with a manifold system 54 that is capable of supplying autoclave pressure to the bladder 52. Next, at step 112, a vacuum bag 48 is sealed over the tool 46 and over the manifold system 54. The vent tubes 56 pass through and are sealed to the vacuum bag 48. At step 114, the bladders 52 are vented to autoclave pressure through the vacuum bag 48 using the manifold system 54. At step 126, the bladders 52 are pressurized using autoclave pressure delivered through the vent tubes 56.

Figure 22:
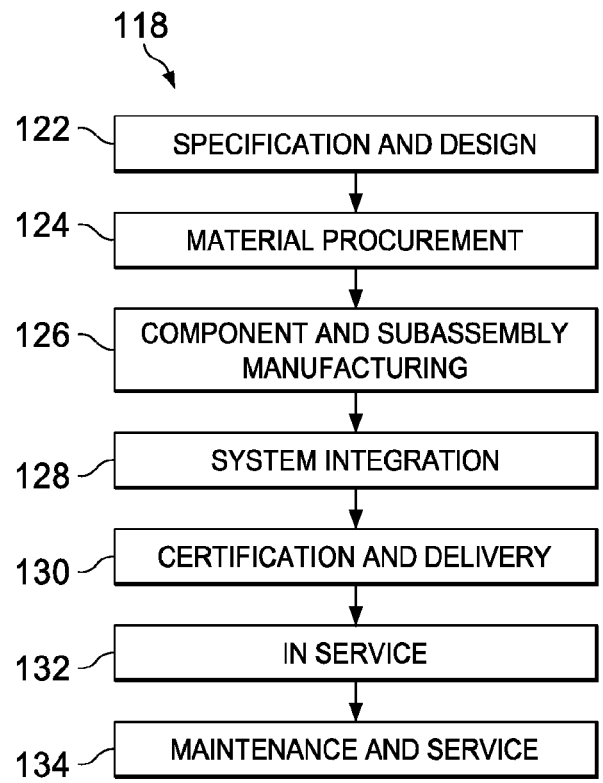
FIG. 22 is an illustration of a flow diagram of aircraft production and service methodology.
Figure 23:
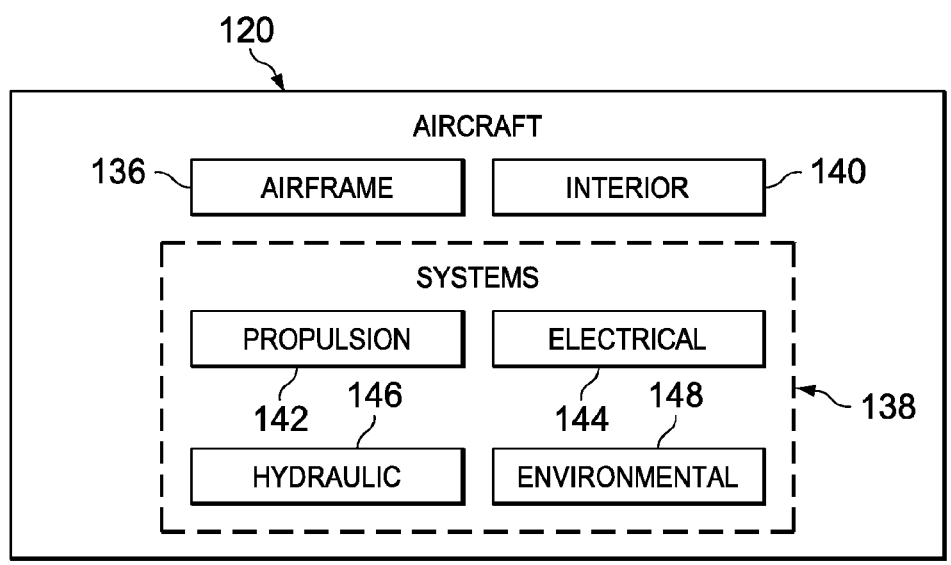
FIG. 23 is an illustration of a block diagram of an aircraft.

Embodiments of the disclosure may find use in a variety of potential applications, particularly in the transportation industry, including for example, aerospace, marine, automotive applications and other application where autoclave curing of composite parts may be used. Thus, referring now to FIGS. 22 and 23, embodiments of the disclosure may be used in the context of an aircraft manufacturing and service method 94 as shown in FIG. 22 and an aircraft 120 as shown in FIG. 23. Aircraft applications of the disclosed embodiments may include, for example, without limitation, curing of stiffeners and stiffened skins such as, without limitation beams, spars stringers and wing skins, to name only a few. During pre-production, exemplary method 118 may include specification and design 122 of the aircraft 120 and material procurement 124. During production, component and subassembly manufacturing 126 and system integration 128 of the aircraft 120 takes place. Thereafter, the aircraft 120 may go through certification and delivery 130 in order to be placed in service 132. While in service by a customer, the aircraft 120 is scheduled for routine maintenance and service 134, which may also include modification, reconfiguration, refurbishment, and so on.

Each of the processes of method 118 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 23, the aircraft 120 produced by exemplary method 118 may include an airframe 136 with a plurality of systems 138 and an interior 140. Examples of high-level systems 138 include one or more of a propulsion system 142, an electrical system 144, a hydraulic system 146, and an environmental system 148. Any number of other systems may be included. Although an aerospace example is shown, the principles of the disclosure may be applied to other industries, such as the marine and automotive industries.

Systems and methods embodied herein may be employed during any one or more of the stages of the production and service method 118. For example, components or subassemblies corresponding to production process 126 may be fabricated or manufactured in a manner similar to components or subassemblies produced while the aircraft 120 is in service. Also, one or more apparatus embodiments, method embodiments, or a combination thereof may be utilized during the production stages 126 and 128, for example, by substantially expediting assembly of or reducing the cost of an aircraft 120. Similarly, one or more of apparatus embodiments, method embodiments, or a combination thereof may be utilized while the aircraft 120 is in service, for example and without limitation, to maintenance and service 34.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for autoclave curing composite stiffeners against a composite skin, comprising:
    a tool having a tool surface on which a composite skin may be placed, and at least one channel adapted to have a composite stiffener placed therein beneath the skin;
    at least one pressurizable bladder adapted to be placed inside the channel for reacting autoclave pressure applied to the stiffener;
    a vacuum bag adapted to be sealed over the tool for compacting the skin against the stiffener; and
    a manifold system coupled with the bladder for pressurizing the bladder using autoclave pressure, the manifold system including a vent tube passing through the vacuum bag and exposed to autoclave pressure.

2. The apparatus of claim 1, further comprising:
    a frame, and
    wherein the bag is a reusable bag and is attached to the frame.

3. The apparatus of claim 1, wherein:
    the bladder includes a vent fitting on one end thereof, and
    the manifold system is coupled with the vent fitting.

4. The apparatus of claim 3, wherein the manifold system includes:
    a manifold box, and wherein
    the vent tube is mounted on the manifold box and coupled with the vent fitting.

5. The apparatus of claim 4, wherein:
    the manifold box includes a top wall located beneath and in contact with the vacuum bag when the vacuum bag is sealed over the tool, and
    the vent tube passes through the top wall.

6. The apparatus of claim 5, further comprising a seal between the vacuum bag and the vent tube.

7. The apparatus of claim 1, wherein:
the manifold system and the vent tube are located along a side of the tool, and
the vacuum bag is adapted to be sealed to the vent tube.

8. Apparatus for autoclave a plurality of composite stiffeners and a composite skin, comprising:
- a tool adapted to have a composite skin placed thereon, the tool including a plurality of tool channels therein, each of the tool channels adapted to have a composite stiffener placed therein and contact with the skin;
- a bag adapted to be placed over the skin and exposed to autoclave pressure for compacting the skin against the stiffeners;
- a plurality of bladders respectively adapted to be placed within the stiffeners for reacting autoclave pressure applied to the stiffeners through the bag; and
- a manifold system located along one end of the tool channels and disposed beneath the bag for coupling the bladders with autoclave pressure.

9. The apparatus of claim 8, wherein the manifold system includes:
- a manifold box having a top wall adapted to be engaged by the bag,
- a vent tube passing through the top wall of the manifold box and through the bag, and
- lines coupling the vent tube with ends of the bladders.

10. The apparatus of claim 9, further comprising:
a seal between the vent tube and the bag for sealing the bag to the vent tube.

11. The apparatus of claim 8, further comprising:
a frame; and
clamps for clamping a periphery of the bag between the tool and the frame.

12. The apparatus of claim 11, wherein the manifold system is located inside of the periphery of the bag.

13. The apparatus of claim 8, wherein:
each of the bladders is elongate and includes a vent fitting on one end thereof, and
the manifold system is releasably coupled with each of the vent fittings.

14. The apparatus of claim 9, wherein the manifold system includes:
a plurality of manifold boxes arranged end-to-end and each having a top,
a plurality of vent tubes respectively passing through the tops of the manifold boxes and through the bag, and wherein
the vent tubes are coupled with ends of the bladders and are sealed to the bag.

* * * * *

UNITED STATES PATENT AND TRADEMARK OFFICE
CERTIFICATE OF CORRECTION

PATENT NO. : 9,738,039 B2  
APPLICATION NO. : 15/150425  
DATED : August 22, 2017  
INVENTOR(S) : Stephens et al.

Page 1 of 1

It is certified that error appears in the above-identified patent and that said Letters Patent is hereby corrected as shown below:

In the Claims

Column 8, Line 37, change "which a composite skin" to --which the composite skin--  
Column 9, Line 5, change "autoclave a plurality" to --autoclave curing a plurality--  
Column 9, Line 7, change "have a composite skin" to --have the composite skin--

Signed and Sealed this  
Thirteenth Day of November, 2018

Andrei Iancu  
*Director of the United States Patent and Trademark Office*